United States Patent
Dambrackas

(10) Patent No.: US 9,743,095 B2
(45) Date of Patent: *Aug. 22, 2017

(54) VIDEO COMPRESSION ENCODER

(71) Applicant: Avocent Corporation, Huntsville, AL (US)

(72) Inventor: William A. Dambrackas, Weston, FL (US)

(73) Assignee: Avocent Corporation, Huntsville, AL (US)

( * ) Notice: Subject to any disclaimer, the term of this patent is extended or adjusted under 35 U.S.C. 154(b) by 735 days.

This patent is subject to a terminal disclaimer.

(21) Appl. No.: 13/908,647

(22) Filed: Jun. 3, 2013

(65) Prior Publication Data

US 2013/0266062 A1    Oct. 10, 2013

Related U.S. Application Data

(63) Continuation of application No. 12/801,293, filed on Jun. 2, 2010, now Pat. No. 8,457,195, which is a
(Continued)

(51) Int. Cl.
*H04N 19/20* (2014.01)
*H04N 19/105* (2014.01)
(Continued)

(52) U.S. Cl.
CPC .......... *H04N 19/20* (2014.11); *H04N 19/105* (2014.11); *H04N 19/182* (2014.11);
(Continued)

(58) Field of Classification Search
None
See application file for complete search history.

(56) References Cited

U.S. PATENT DOCUMENTS

| 3,925,762 A | 12/1975 | Heitlinger et al. |
| 4,384,327 A | 5/1983 | Conway et al. |

(Continued)

FOREIGN PATENT DOCUMENTS

| EP | 0395416 | 10/1990 |
| EP | 0780773 A1 | 6/1997 |

(Continued)

OTHER PUBLICATIONS

U.S. Appl. No. 10/260,534, filed Oct. 1, 2002, Dambrackas.
(Continued)

*Primary Examiner* — Eileen Adams
(74) *Attorney, Agent, or Firm* — Davidson Berquist Jackson & Gowdey LLP

(57) ABSTRACT

A video compression system is disclosed that is optimized to take advantage of the types of redundancies typically occurring on computer screens and the types of video loss acceptable to real time interactive computer users. It automatically adapts to a wide variety of changing network bandwidth conditions and can accommodate any video resolution and an unlimited number of colors. The disclosed video compression encoder can be implemented with either hardware or software and it compresses the source video into a series of data packets that are a fixed length of 8 bits or more. Sequences of one or more of these packets create unique encoding "commands" that can be sent over any network and easily decoded (decompressed) with either software or hardware. The commands include 3 dimensional copying (horizontal, vertical and time) and unique efficiencies for screen segments that are comprised of only two colors (such as text). Embodiments are also disclosed that improve the video compression depending on the popularity of pixel colors.

8 Claims, 12 Drawing Sheets

Related U.S. Application Data continuation of application No. 11/819,047, filed on Jun. 25, 2007, now Pat. No. 7,809,058, which is a continuation of application No. 10/260,534, filed on Oct. 1, 2002, now Pat. No. 7,321,623.

(51) Int. Cl.
*H04N 19/593* (2014.01)
*H04N 19/182* (2014.01)
*H04N 19/426* (2014.01)
*H04N 19/93* (2014.01)
*H04N 19/507* (2014.01)

(52) U.S. Cl.
CPC ......... *H04N 19/426* (2014.11); *H04N 19/507* (2014.11); *H04N 19/593* (2014.11); *H04N 19/93* (2014.11); *G09G 2370/24* (2013.01)

(56) References Cited

U.S. PATENT DOCUMENTS

| | | |
|---|---|---|
| 4,764,769 A | 8/1988 | Hayworth et al. |
| 4,774,587 A | 9/1988 | Schmitt |
| 4,855,825 A | 8/1989 | Santamaki et al. |
| 4,959,833 A | 9/1990 | Mercola et al. |
| 5,083,214 A | 1/1992 | Knowles |
| 5,235,595 A | 8/1993 | O'Dowd |
| 5,251,018 A | 10/1993 | Jang et al. |
| 5,418,952 A | 5/1995 | Morley et al. |
| 5,430,848 A | 7/1995 | Waggener |
| 5,566,339 A | 10/1996 | Perholtz et al. |
| 5,659,707 A | 8/1997 | Wang et al. |
| 5,664,223 A | 9/1997 | Bender et al. |
| 5,721,842 A | 2/1998 | Beasley et al. |
| 5,731,706 A | 3/1998 | Koeman et al. |
| 5,732,212 A | 3/1998 | Perholtz et al. |
| 5,754,836 A | 5/1998 | Rehl |
| 5,764,479 A | 6/1998 | Crump et al. |
| 5,764,924 A | 6/1998 | Hong |
| 5,764,966 A | 6/1998 | Mote, Jr. |
| 5,781,747 A | 7/1998 | Smith et al. |
| 5,799,207 A | 8/1998 | Wang et al. |
| 5,805,735 A * | 9/1998 | Chen ................ G06T 9/005 358/524 |
| 5,812,534 A | 9/1998 | Davis et al. |
| 5,844,940 A | 12/1998 | Goodson et al. |
| 5,861,764 A | 1/1999 | Singer et al. |
| 5,870,429 A | 2/1999 | Moran et al. |
| 5,898,861 A | 4/1999 | Emerson et al. |
| 5,946,451 A | 8/1999 | Soker |
| 5,948,092 A | 9/1999 | Crump et al. |
| 5,967,853 A | 10/1999 | Hashim |
| 5,997,358 A | 12/1999 | Adriaenssens et al. |
| 6,003,105 A | 12/1999 | Vicard et al. |
| 6,012,101 A | 1/2000 | Heller et al. |
| 6,016,316 A | 1/2000 | Moura et al. |
| 6,032,261 A | 2/2000 | Hulyalkar |
| 6,055,597 A | 4/2000 | Houg |
| 6,060,890 A | 5/2000 | Tsinker |
| 6,065,073 A | 5/2000 | Booth |
| 6,070,214 A | 5/2000 | Ahern |
| 6,084,638 A | 7/2000 | Hare et al. |
| 6,134,613 A | 10/2000 | Stephenson et al. |
| 6,146,158 A | 11/2000 | Peratoner et al. |
| 6,202,116 B1 | 3/2001 | Hewitt |
| 6,240,481 B1 | 5/2001 | Suzuki |
| 6,240,554 B1 | 5/2001 | Fenouil |
| 6,345,323 B1 | 2/2002 | Beasley et al. |
| 6,370,191 B1 | 4/2002 | Mahant-Shetti et al. |
| 6,377,313 B1 | 4/2002 | Yang et al. |
| 6,377,640 B2 | 4/2002 | Trans |
| 6,404,932 B1 | 6/2002 | Hata et al. |
| 6,418,494 B1 | 7/2002 | Shatas et al. |
| 6,425,033 B1 | 7/2002 | Conway et al. |
| 6,496,601 B1 * | 12/2002 | Migdal ................ G06T 9/001 382/239 |
| 6,516,371 B1 | 2/2003 | Lai et al. |
| 6,522,365 B1 | 2/2003 | Levantovsky et al. |
| 6,567,464 B2 | 5/2003 | Hamdi |
| 6,571,393 B1 | 5/2003 | Ko et al. |
| 6,590,930 B1 | 7/2003 | Greiss |
| 6,664,969 B1 | 12/2003 | Emerson et al. |
| 6,785,424 B1 | 8/2004 | Sakamoto |
| 6,833,875 B1 | 12/2004 | Yang et al. |
| 6,972,786 B1 | 12/2005 | Ludwig |
| 7,020,732 B2 | 3/2006 | Shatas et al. |
| 7,221,389 B2 | 5/2007 | Ahern et al. |
| 7,277,104 B2 | 10/2007 | Dickens et al. |
| 7,321,623 B2 | 1/2008 | Dambrackas |
| 7,336,839 B2 | 2/2008 | Gilgen |
| 7,457,461 B2 | 11/2008 | Gilgen |
| 7,466,713 B2 | 12/2008 | Saito |
| 7,515,632 B2 | 4/2009 | Dambrackas |
| 7,609,721 B2 | 10/2009 | Rao et al. |
| 7,782,961 B2 | 8/2010 | Shelton et al. |
| 7,809,058 B2 * | 10/2010 | Dambrackas ........ H04N 19/105 375/240.01 |
| 7,941,634 B2 | 5/2011 | Georgi et al. |
| 2001/0048667 A1 | 12/2001 | Hamdi |
| 2004/0017514 A1 | 1/2004 | Dickens et al. |
| 2004/0062305 A1 | 4/2004 | Dambrackas |
| 2004/0064198 A1 | 4/2004 | Reynolds et al. |
| 2004/0122931 A1 | 6/2004 | Rowland et al. |
| 2005/0005102 A1 | 1/2005 | Meggitt et al. |
| 2005/0108582 A1 | 5/2005 | Fung |
| 2005/0157799 A1 | 7/2005 | Raman et al. |
| 2005/0198245 A1 | 9/2005 | Burgess et al. |
| 2005/0249207 A1 | 11/2005 | Zodnik |
| 2006/0039404 A1 | 2/2006 | Rao et al. |
| 2006/0161635 A1 | 7/2006 | Lamkin et al. |
| 2006/0262226 A1 | 11/2006 | Odryna et al. |
| 2007/0180407 A1 | 8/2007 | Vahtola |
| 2009/0290647 A1 | 11/2009 | Shelton et al. |

FOREIGN PATENT DOCUMENTS

| | | |
|---|---|---|
| EP | 0 844 567 | 5/1998 |
| EP | 0270896 | 6/1998 |
| GB | 2350039 | 11/2000 |
| GB | 2388504 | 11/2003 |
| JP | 62-077935 | 10/1987 |
| JP | H03-130767 | 4/1991 |
| JP | 3192457 | 8/1991 |
| JP | 6-77858 | 3/1994 |
| JP | 09-321672 | 12/1997 |
| JP | 10-215379 | 8/1998 |
| JP | 11-184800 | 7/1999 |
| JP | 11-184801 | 7/1999 |
| JP | 2000-125111 | 4/2000 |
| JP | 2001-053620 | 2/2001 |
| JP | 2001-148849 | 5/2001 |
| JP | 2002-043950 | 2/2002 |
| JP | 2003-174565 | 6/2003 |
| JP | 2003-244448 | 8/2003 |
| JP | 2003-250053 | 9/2003 |
| JP | 2004-032698 | 1/2004 |
| WO | WO 97/41514 | 11/1997 |
| WO | WO 98/54893 | 12/1998 |
| WO | WO 01/22628 | 3/2001 |
| WO | WO 03/055094 | 7/2003 |
| WO | WO 03/071804 | 8/2003 |
| WO | WO 2004/032356 | 4/2004 |
| WO | WO 2004/081772 | 9/2004 |

OTHER PUBLICATIONS

U.S. Appl. No. 10/434,339, filed May 9, 2003, Dambrackas.
U.S. Appl. No. 10/629,855, filed Jul. 30, 2003, Johnson et al.
U.S. Appl. No. 10/875,678, filed Jun. 25, 2004, Gilgen.
U.S. Appl. No. 10/875,679, filed Jun. 25, 2004, Gilgen.
U.S. Appl. No. 11/282,688, filed Nov. 21, 2005, Dambrackas et al.
U.S. Appl. No. 11/339,537, filed Jan. 26, 2006, Dambrackas.
U.S. Appl. No. 11/339,541, filed Jan. 26, 2006, Dambrackas.
U.S. Appl. No. 11/339,542, filed Jan. 26, 2006, Dambrackas.

(56) References Cited

OTHER PUBLICATIONS

U.S. Appl. No. 11/340,476, filed Jan. 27, 2006, Dambrackas.
U.S. Appl. No. 11/528,569, filed Sep. 28, 2006, Dambrackas et al.
U.S. Appl. No. 11/707,863, filed Feb. 20, 2007, Hickey et al.
U.S. Appl. No. 11/707,879, filed Feb. 20, 2007, Hickey et al.
U.S. Appl. No. 11/707,880, filed Feb. 20, 2007, Hickey et al.
U.S. Appl. No. 11/819,047, filed Jun. 25, 2007, Dambrackas.
U.S. Appl. No. 11/889,268, filed Aug. 8, 2007, Hickey et al.
U.S. Appl. No. 60/774,186, filed Feb. 17, 2006, Hickey.
U.S. Appl. No. 60/795,557, filed Apr. 28, 2006, Shelton, Gary.
U.S. Appl. No. 60/836,649, filed Aug. 10, 2006, Hickey.
U.S. Appl. No. 60/836,930, filed Aug. 11, 2006, Hickey.
U.S. Appl. No. 60/848,488, filed Sep. 29, 2006, Hickey.
"Avocent Install and Discovery Protocol Specification," Version 1.3, Avocent Corporation Jul. 9, 2003 [30 pages].
"Avocent Secure Management Protocol Specification," Version 1.8, Avocent Corporation Apr. 8, 2005 [64 pages].
"Lossless and Near-Lossless Coding of Continuous Tone Still Images (JPEG-LS)", ISO/IEC JTC1/SC29/WG1 FCD 14495—Public Draft, XX, XX Jul. 16, 1997, pp. I-IV,1, XP002260316, Retrieved from the Internet: URL:http://www.jpeg.org/public/fcd14495p.pdf paragraphs [04.2], [04.4], [A.
Bowling, Carl D. et al., "Motion Compensated Image Coding with a Combined Maximum A Posteriori and Regression Algorithm," IEEE Transactions on Communications, New York, USA, vol. COM-33, No. 8, Aug. 1, 1985, pp. 844-857.
CA 2,625,658—Jan. 14, 2013 CIPO Office Action.
CA Appln. No. 2,382,403—Dec. 8, 2009 CIPO Office Action.
CA Appln. No. 2,476,102—Apr. 16, 2009 CIPO Office Action.
CA Appln. No. 2,524,001—Nov. 30, 2009 CIPO Office Action.
CA Appln. No. 2,524,001—Aug. 30, 2010 CIPO Office Action.
CA Appln. NJ. 2,571,478—Jan. 31, 2012 CIPO Office Action.
CA Appln. No. 2,627,037—Sep. 9, 2010 CIPO Office Action.
CA Appln. No. 2,630,532—Jul. 25, 2011 CIPO Office Action.
CA Appln. No. 2,630,532—Nov. 27, 2012 CIPO Office Action.
CA Appln. No. 2,650,663—Feb. 1, 2012 CIPO Office Action.
CA Appln. No. 2,676,794—Feb. 12, 2010 CIPO Office Action.
CN Appln. No. 200710167085.2—Aug. 6, 2010 SIPO Office Action.
CN Appln. No. 200710167085.2—Dec. 27, 2010 SIPO Office Action translation.
Digital Semiconductor 21152 PCI-TO-PCI Bridge, Data Sheet, Feb. 1996, Digital Equipment Corporation, Maynard, Mass.
Duft et al. (ed.) "Xilinx Breaks One Million-Gate Barrier with Delivery of New Virtex Series", Press Kit, Xilinx, Oct. 1998.
EP Appln. No. 03818864.5—May 8, 2009 EPO Office Action.
EP Appln. No. 03818864.5—Sep. 20, 2012 EPO Office Action.
EP Appln. No. 05754824.0—Jul. 6, 2012 EPO Supplementary Search Report.
EP Appln. No. 05754824.0—Sep. 14, 2012 EPO Office Action.
EP Appln. No. 05756603.6—Nov. 23, 2010 EPO Supplementary Search Report.
EP Appln. No. 05756603.6—Dec. 13, 2011 EP Office Action.
European Office Action in EP Appln. No. 057566036, dated Apr. 7, 2011 [6 pages].
European Office Action in European application 99960160.2, dated Mar. 16, 2006.
European Office Action in European Application No. 99960160.2-2212 dated Nov. 15, 2006.
Extended European Search Report dated Feb. 14, 2012 in EPO Appln. No. 05854984.1.
Hill, T. "Virtex Design Methodology Using Leonardo Spectrum 1999.1", Applications Note, Exemplar Logic Technical Marketing, Apr. 1999, Rev. 3.0, pp. 1-47.
Hsieh et al "Architectural Power Optimization by Bus Splitting", Design, Automation and Test in Europe Conference and Exhibition 2000. Proceedings, pp. 612-616.
IBM Tech. Disc. Bull. "Procedure and Design to Facilitate", Apr. 1994, vol. 37, Issue 4B, pp. 215-216.
IBM Technical Disclosure Bulletin, "Multimedia System Packaging", Sep. 1993, vol. 36, Issue 9A, pp. 525-530.
IL Appln. No. 167787—Jul. 21, 2009 Office Action.
IL Appln. No. 184058—Jul. 14, 2010 Ministry of Justice Commissioner of Patents Office Action with translation.
International Preliminary Examination Report in PCT application PCT/US2003/04707, dated Oct. 1, 2004.
International Search Report and Written Opinion dated Aug. 1, 2008 in PCT Application PCT/US05/46352.
International Search Report and Written Opinion dated Jul. 29, 2008 in PCT Application PCT/US07/17700.
International Search Report and Written Opinion dated Sep. 14, 2010 in PCT Appln. No. PCT/US2010/001941.
International Search Report relating to PCT/US03/04707 dated Jul. 11, 2003.
International Search Report, PCT/US99/25290 dated Feb. 10, 2000.
International Search Report, PCT/US99/25291 dated Feb. 7, 2000.
JP 2007-518071—Feb. 8, 2011 JIPO Office Action.
JP Appln. No. 2003-570573—Jul. 21, 2009 Office Action with English translation.
JP Appln. No. 2005-510478—Jul. 7, 2009 Notice of Reasons for Rejection [English translation].
JP Appln. No. 2005-510478—Jul. 6, 2010 Decision of Rejection (English translation).
JP Appln. No. 2006-271932—Oct. 6, 2009 Office Action with English summary.
JP Appln. No. 2007-098267—Jul. 27, 2010 JPO Notice of Reasons for Rejection with translation.
JP Appln. No. 2007-518071—Sep. 6, 2011 Decision of Rejection with statement of relevancy.
JP Appln. No. 2007-518086—Feb. 15, 2011 JPO Office Action.
JP Appln. No. 2007-518086—Jun. 21, 2011 JIPO Office Action.
Kyeong Ho Yang et al: "A contex-based predictive coder for lossless and near-lossless compression of video", Image Processing, 2000. Proceedings. 2000 International Conference on Sep. 10-13, 2000, IEEE, Piscataway, NJ, USA, vol. 1, Sep. 10, 2000 pp. 144-141.
McCloghrie, K., "Management Information Base for Network Management of TCP/IP-based internets: MIB II," Network Working Group, Performance Systems International, (RFC 1213) Mar. 1991 [70 pages].
Mobility Electronics, Inc. Brochure for PCI Split Bridge, Scottsdale, AZ, 1999.
MY Appln. No. P120030508—Mar. 6, 2007 MYIPO Substantive Examination Adverse Report.
MY Appln. No. P120056038—Sep. 11, 2009 MyIPO Substantive Examination Adverse Report.
MY Appln. No. PI20056038—Aug. 30, 2010 MyIPO Substantive Examination Adverse Report.
MY Appln. No. PI20062195—Sep. 11, 2009 MYIPO Adverse Examination Report.
MY Appln. No. PI20084298—Aug. 30, 2012 MyIPO Substantive Examination Adverse Report.
Official Action dated Feb. 6, 2008 in Japanese Application No. 2003-570573 [with English translation].
Official Letter dated Mar. 16, 2012 in TW 94117242.
PCI Local Bus Specification, Revision 2.1, Jun. 1995, The PCI Special Interest Group, Portland, Oregon.
PCT Written Opinion in PCT application PCT/US2003/04707, dated Mar. 4, 2004.
Puri, A. et al., "Motion-compensated transform coding based on block motion-tracking algorithm," International Conferences on Communications 1987, IEEE, pp. 136-140.
Schutti et al. "Data Transfer between Asynchronous Clock Domains without Pain", RIIC, SNUG Europe 2000, Rev. 1.1, Feb. 2000, pp. 1-12.
Search Report and Written Opinion dated Jul. 16, 2008 in PCT Appln. No. PCT/US2007/17699.
Supplementary European Search Report dated Aug. 9, 2010 in EP Appln. No. 03709132.9.
TW Appln. No. 94145077—May 17, 2012 Taiwanese Patent Office Official Letter.
U.S. Appl. No. 10/629,855—May 28, 2013 PTO Office Action.
U.S. Appl. No. 10/629,855—Aug. 12, 2014 Examiner's Answer.

(56) References Cited

OTHER PUBLICATIONS

U.S. Appl. No. 11/282,688—Apr. 28, 2010 PTO Office Action.
U.S. Appl. No. 11/303,031—Apr. 29, 2009 PTO Office Action.
U.S. Appl. No. 11/528,569—May 20, 2011 PTO Office Action.
U.S. Appl. No. 11/707,879—Nov. 28, 2011 PTO Office Action.
U.S. Appl. No. 11/790,994—Feb. 2, 2010 PTO Office Action.
U.S. Appl. No. 11/889,525—Feb. 15, 2012 PTO Office Action.
U.S. Appl. No. 12/458,818—Nov. 22, 2011 PTO Office Action.
U.S. Appl. No. 12/458,818—Jan. 26, 2012 PTO Office Action.
U.S. Appl. No. 12/533,073—Mar. 9, 2011 PTO Office Action.
U.S. Appl. No. 12/533,073—May 23, 2011 PTO Office Action.
U.S. Appl. No. 13/749,219—Oct. 22, 2014 PTO Office Action.

* cited by examiner

|     |                                                  | 7 6 5 4 3 2 1 0 |
|-----|--------------------------------------------------|-----------------|
| CO  | Copy from Old pixels at the current positions    | 0 0 0 R R R R R |
| CL  | Copy from pixel to the Left of current position  | 0 0 1 R R R R R |
| CA  | Copy from pixels Above the current positions     | 0 1 0 R R R R R |
| MS  | Make a Series of pixels (from a 2-color set)     | 0 1 1 E C C C C |
| MP  | Make one Pixel (using this 7-bit color)          | 1 P P P P P P P |

Figure 3

MP command that is 2-bytes long
(Provides for a 15-bit color)

| 7 6 5 4 3 2 1 0 |
|-----------------|
| 1 P P P P P P P |
| P P P P P P P P |

Figure 4

MP command that is 3-bytes long
(Provides for a 23-bit color)

| 7 6 5 4 3 2 1 0 |
|-----------------|
| 1 P P P P P P P |
| P P P P P P P P |
| P P P P P P P P |

Figure 5

|   | 7 | 6 | 5 | 4 | 3 | 2 | 1 | 0 |
|---|---|---|---|---|---|---|---|---|
| CO Command extended to 2 bytes long (Provides for a 10-bit repeat count) | 0 | 0 | 0 | R | R | R | R | R |
|  | 0 | 0 | 0 | R | R | R | R | R |

Figure 6

|   | 7 | 6 | 5 | 4 | 3 | 2 | 1 | 0 |
|---|---|---|---|---|---|---|---|---|
| CO Command extended to 3 bytes long (Provides for a 15-bit repeat count) | 0 | 0 | 0 | R | R | R | R | R |
|  | 0 | 0 | 0 | R | R | R | R | R |
|  | 0 | 0 | 0 | R | R | R | R | R |

Figure 7

|   | 7 | 6 | 5 | 4 | 3 | 2 | 1 | 0 |
|---|---|---|---|---|---|---|---|---|
| CL Command extended to 3 bytes long (Provides for a 15-bit repeat count) | 0 | 0 | 1 | R | R | R | R | R |
|  | 0 | 0 | 1 | R | R | R | R | R |
|  | 0 | 0 | 1 | R | R | R | R | R |

Figure 8

| | 7 | 6 | 5 | 4 | 3 | 2 | 1 | 0 |
|---|---|---|---|---|---|---|---|---|
| MS Command extended to 2 bytes long (Provides for a 11-pixel series) | 0 | 1 | 1 | 1 | C | C | C | C |
| | 0 | C | C | C | C | C | C | C |

Figure 9

| | 7 | 6 | 5 | 4 | 3 | 2 | 1 | 0 |
|---|---|---|---|---|---|---|---|---|
| MS Command extended to 13 bytes long (Provides for a 88-pixel series) | 0 | 1 | 1 | 1 | C | C | C | C |
| | 1 | C | C | C | C | C | C | C |
| | 1 | C | C | C | C | C | C | C |
| | 1 | C | C | C | C | C | C | C |
| | 1 | C | C | C | C | C | C | C |
| | 1 | C | C | C | C | C | C | C |
| | 1 | C | C | C | C | C | C | C |
| | 1 | C | C | C | C | C | C | C |
| | 1 | C | C | C | C | C | C | C |
| | 1 | C | C | C | C | C | C | C |
| | 1 | C | C | C | C | C | C | C |
| | 1 | C | C | C | C | C | C | C |
| | 0 | C | C | C | C | C | C | C |

Figure 10

| | | 7 6 5 4 3 2 1 0 |
|---|---|---|
| CO | Copy from Old pixels at the current positions | 0 0 0 R R R R R |
| CL | Copy from pixel to the Left of current position | 0 0 1 R R R R R |
| CA | Copy from pixels Above the current positions | 0 1 0 R R R R R |
| MS | Make a Series of pixels (from a 2-color set) | 1 C C C C C C C |
| MP | Make one Pixel (using this 5-bit color) | 0 1 1 P P P P P |

Figure 19

| | 7 6 5 4 3 2 1 0 |
|---|---|
| MS Command extended to 2 bytes long (Provides for a 14-pixel series) | 1 C C C C C C C <br> 1 C C C C C C C |

Figure 20

| | 7 6 5 4 3 2 1 0 |
|---|---|
| MS Command extended to 5 bytes long (Provides for a 35-pixel series) | 1 C C C C C C C <br> 1 C C C C C C C <br> 1 C C C C C C C <br> 1 C C C C C C C <br> 1 C C C C C C C |

Figure 21

| MP | Make one Pixel (using these 4 or 12 color bits) |

| 7 | 6 | 5 | 4 | 3 | 2 | 1 | 0 |
|---|---|---|---|---|---|---|---|
| 0 | 1 | 1 | A | P | P | P | P |
| G | G | G | G | B | B | B | B |

Figure 22

| MP | Make one Pixel (using this 12-bit color) |

| 7 | 6 | 5 | 4 | 3 | 2 | 1 | 0 |
|---|---|---|---|---|---|---|---|
| 0 | 1 | 1 | 0 | P | P | P | P |
| G | G | G | G | B | B | B | B |

P = red, G = green, B = blue

Figure 23

| MP | Make one Pixel (using this 4-bit gray) |

| 7 | 6 | 5 | 4 | 3 | 2 | 1 | 0 |
|---|---|---|---|---|---|---|---|
| 0 | 1 | 1 | 1 | P | P | P | P |

P = red, green and blue

Figure 24

VIDEO COMPRESSION ENCODER

The present application is a continuation of U.S. application Ser. No. 12/801,296 filed Jun. 2, 2010, which is a continuation of U.S. application Ser. No. 11/819,047 filed Jun. 25, 2007, now U.S. Pat. No. 7,809,058, which is a continuation of U.S. application Ser. No. 10/260,534 filed Oct. 1, 2002 and now U.S. Pat. No. 7,321,623 granted on Jan. 22, 2008, the entire contents of which are incorporated herein by reference.

FIELD OF THE INVENTION

This invention relates to computer data processing, and more particularly to computer video compression.

BACKGROUND OF THE INVENTION

Existing video compression systems can compress a stream of video data so it takes less bandwidth to send over a communication channel. Such systems take advantage of redundancies expected to occur in the video they are aiming to compress. For example, JPEG and MPEG take advantage of frequent similarities in the colors of adjacent pixels in photographic images. In addition, MPEG takes advantage of the fact that motion pictures often have many pixels that stay the same color during many frames of video or only shift their positions on the screen as the camera moves.

Video can be further compressed depending on how much degradation in video quality (or "video loss") is acceptable to the person (or "user") viewing the video, but the acceptability of different types of video loss is highly dependent on the user's activity (or "application"). The four types of video loss are; (1) resolution loss (appears blurred), (2) color depth loss (has fewer shades of colors), (3) frame rate loss (stalling or jerkiness of a motion picture) and (4) time loss or "video delay" (time delay from video capture to its availability for viewing).

To achieve higher compression ratios, different compression systems take advantage of the types of video loss that are the most acceptable to the users they aim to satisfy. For example, with MPEG, fast action scenes that would generate too much data for the communication channel are sent with resolution loss because movie viewers accept resolution loss better than they accept frame rate loss or color depth loss.

Video delay is not a problem in some applications but it is a serious problem in other applications. Different compression systems impose different amounts of delay as they compress the video. Systems that impose more delay achieve higher compression ratios because all the video frames captured, held and examined during the delay provide a better opportunity to decide how to compress them. One example might be: "is the camera moving or is just one object in the scene moving".

Video delay is not a problem with "one-way" user activities, such as watching movies; therefore, the compression systems used for these applications (such as MPEG) impose a long delay (many seconds or more) before compressing the video and beginning to send it over the communication channel. In fact, when the communication channel is a network with indeterminate bandwidth availability (such as the Internet), the video received from the network is often buffered and delayed for many more seconds before it is displayed (to eliminate the stalling caused by network congestion). Although time delay is not a problem with one-way user activities such as watching movies, it is a serious problem for real time "interactive" users, such as users with a mouse, controlling a cursor that is a part of the compressed video image.

One such example of real time interactive users relates to the remoting of a computer KVM console (Keyboard, Video display and Mouse) over a communication channel. In these "remote console" applications, keyboard and mouse data are sent from the remote console over the communication channel and "switched" to one of a number of "target" server computers, just as if the keyboard and mouse were directly connected to that target server. The corresponding video is sent from the target server to the remote console just as if the target server was directly connected to the remote console's video display. Examples of KVM systems are described in commonly-owned U.S. Pat. No. 5,721,842 to Beasley et al and U.S. Pat. No. 5,732,212 to Perholtz et al, each of which is incorporated herein by reference.

The communication channel for some KVM systems provides enough bandwidth to transport the uncompressed video because they use dedicated local cables and a dedicated circuit switch. KVM systems adapted to operate over a network via, for example, Internet protocol (referred to herein for brevity as "KVM/IP" systems) provide limited and indeterminate bandwidth availability compared to a dedicated local cable-based KVM system. Sending keyboard and mouse information from the remote console to the selected target server in a timely fashion is one concern with KVM/IP systems. A greater concern is sending the relatively high volume of video data back to the remote console in a timely fashion. Since today's typical computers output video continuously at over 2 gigabits per second and remote Internet connections (such as DSL) typically operate at less than 1 megabit per second, video compression ratios averaging well over 2000-to-1 are required. Remote Internet connections using dial modems at 50 kilobits per second require even higher average compression ratios.

As a remote console user moves their mouse or types on their keyboard to input new information to the server, those actions must be communicated to the server and acted upon by the server to create new video images, which are sent back to the remote console user's screen. Delays in sending the video back to the remote console user are annoying because they create a temporal lag between the entry of the keyboard or mouse information by the user and the video response perceived by the user on their screen. Delays following keyboard activity are less annoying than delays following mouse movements, thus the term "mouse-cursor response" is used to describe this problem.

This problem of remote console applications (described above) is not applicable to some types of typical web browser applications. With web browser applications, the video cursor image is created locally on the user's computer, so mouse-cursor response is always very good even if the network is slow at responding with server-generated video images. With remote console applications, network delays affect the mouse-cursor response because the cursor is represented as an integral part of the video image coming from the server and sent to the remote console over the network.

In remote console applications, user acceptability for the four types of video loss is the complete opposite from other video applications. As described above, minimum video time delay is a factor in remote console applications, but video delay is a less important type of video loss in other applications. The importance of resolution loss in remote console applications is also the opposite of other applications because the computer screens sent to remote consoles are typically made up of a significant amount of relatively small font alphanumeric text, many small icons and many high contrast sharp edges. Compression systems such as JPEG or MPEG, that impose resolution loss may be satisfactory for many other applications, but they are not satisfactory for reading small font alphanumeric text and images with high contrast sharp edges. The opposite order of user acceptability also applies to color depth loss and frame rate loss. These two types of video loss are the most acceptable by users in remote console applications and the least acceptable in other video applications.

Although existing video compression systems are widely used and well suited for a wide variety of applications, a video compression system optimized for the best possible interactive computer user experience is needed.

BRIEF SUMMARY OF THE INVENTION

The present invention is a new video compression system that is optimized to take advantage of redundancies typically occurring on computer screens and also is optimized to take advantage of types of video loss acceptable to real time interactive computer users. In one embodiment of the present invention, captured frames of computer video are "encoded" into combinations of five different, uniquely chosen "commands", which are selected and sequenced based on their ability to most efficiently compress the captured video. These commands are sent over the network to the "client" where they continuously instruct (or command) the "decoder" on how to decompress or decode the commands and recreate the captured video frames on the remote video display. In a unique way, this embodiment can compress and decompress computer video without resolution loss or color depth loss, but with frame rate loss that is dynamically adjusted depending on available network bandwidth. It also imposes minimal delay during encoding and decoding.

The five commands are; (1) copy old pixels from an earlier frame (sometimes called "no change from an earlier frame," "no change" or simply "NC"), (2) copy pixel from the left, (3) copy pixels from above, (4) make a series of pixels using a 2-color set, and (5) make one or more pixels using a specified color. Each command provides unique efficiencies when employed in a hierarchical structure. Also, the commands are included in comprised of packets that are a fixed length of 8 bits or more, such that they can be easily sent, received and decoded with either software or hardware. The present invention is not limited to any command or packet length, but preferred embodiments would use lengths that were a multiple of 8-bits (such as 16, 32 or 64) such that they would be compatible with popular and commonly available components and processors.

In broader embodiments of the present invention, one, two, three, or four of the types of commands described above are used, alone or in any combination thereof. For example, the inventor believes that the use of the command to make a series of pixels from a 2-color set alone is unique in compressing video that includes a significant amount of alphanumeric text (such as viewing this document with a word processing program). Further advantages and efficiencies are gained when others of the commands are added thereto in various combinations. In other embodiments, one, two, three, four, or all five of the commands are used in conjunction with any kind of prior art compression system to enhance the video compression of the known system. For example, MPEG, JPEG, and others (and all variants thereof (e.g., MPEG2, etc.)) can be used with one or more of the five commands described herein to enhance the video compression of the prior art compression techniques.

In other embodiments of the invention, referred to as the "gray-favored" color modes, the captured video can be further compressed by taking advantage of the fact that remote console users accept color depth loss better than any other type of video loss. In this mode, each pixel of the captured video is converted to the nearest color from a set of specifically chosen colors that match typical colors used on computer screens. Grays are favored in the set of colors since they are favored on typical computer screens (white and black are included in the definition of "grays").

The present invention can be embodied with the compression encoding implemented with hardware, with software or with a combination of hardware and software. Likewise, the decoding can be implemented with hardware, with software or with a combination. The "source" video can be captured by connecting directly to a video controller chip inside a computer. Alternatively, the video can be captured from a computer's external analog video output, external digital video interface (DVI) or other external interface. In one embodiment, the video is compressed with hardware using an FPGA (field programmable gate array) or ASIC (application specific integrated circuit). In another embodiment, the video is compressed completely with software before it is made into a video output stream.

The video compression commands are sent over a network to the remote console where they are decompressed and displayed to the user. The remote console can be a conventional PC (personal computer), which decodes the commands using PC software or it could be a small "thin client" device built with a low performance microprocessor. In one embodiment, the commands are all designed to consist of one or more 8-bit packets so that they can be easily decompressed with software running on a low performance microprocessor. Alternatively, a hardware device (such as an FPGA or ASIC) can completely decode the commands at the remote console. In such a case, the remote console would not require a computing device for command decoding or a video controller chip for displaying the user's video. Such a low-cost hardware (or combined hardware/software) remote console is referred to below as a "microclient."

The present invention also has application in computer "blade" technologies, where individual server computers are contained on single cards, and many of these cards are assembled into a common blade chassis to share a common power supply and central control functions. Conventional cable-based KVM switch technology on the blades can give local cable-attached users access to each blade computer, but if users need KVM access to the blades over a network, the present invention could be included in the blade chassis or on each blade and the video compression commands could be given to a common network interface in the blade chassis to be sent over the network to the various remote consoles.

This invention can thus be employed in generally compressing computer video, for sending computer video over LANs, WANs, dial-up or any other networks, for applications in thin client, microclient, and remote console applications (such as KVM/IP systems).

BRIEF DESCRIPTION OF THE DRAWINGS

The patent application file contains at least one drawing executed in color. Copies of this patent or patent application publication with color drawings will be provided by the Office upon request and payment of the necessary fee.

FIGS. 3-10 are tables of the video compression commands in an example embodiment of the present invention with 8-bit packet lengths;

FIGS. 19-24 are tables of the video compression commands in an alternative embodiment of the present invention for use with the 5-bit and 12-bit color modes.

DETAILED DESCRIPTION OF THE INVENTION

Figure 1:
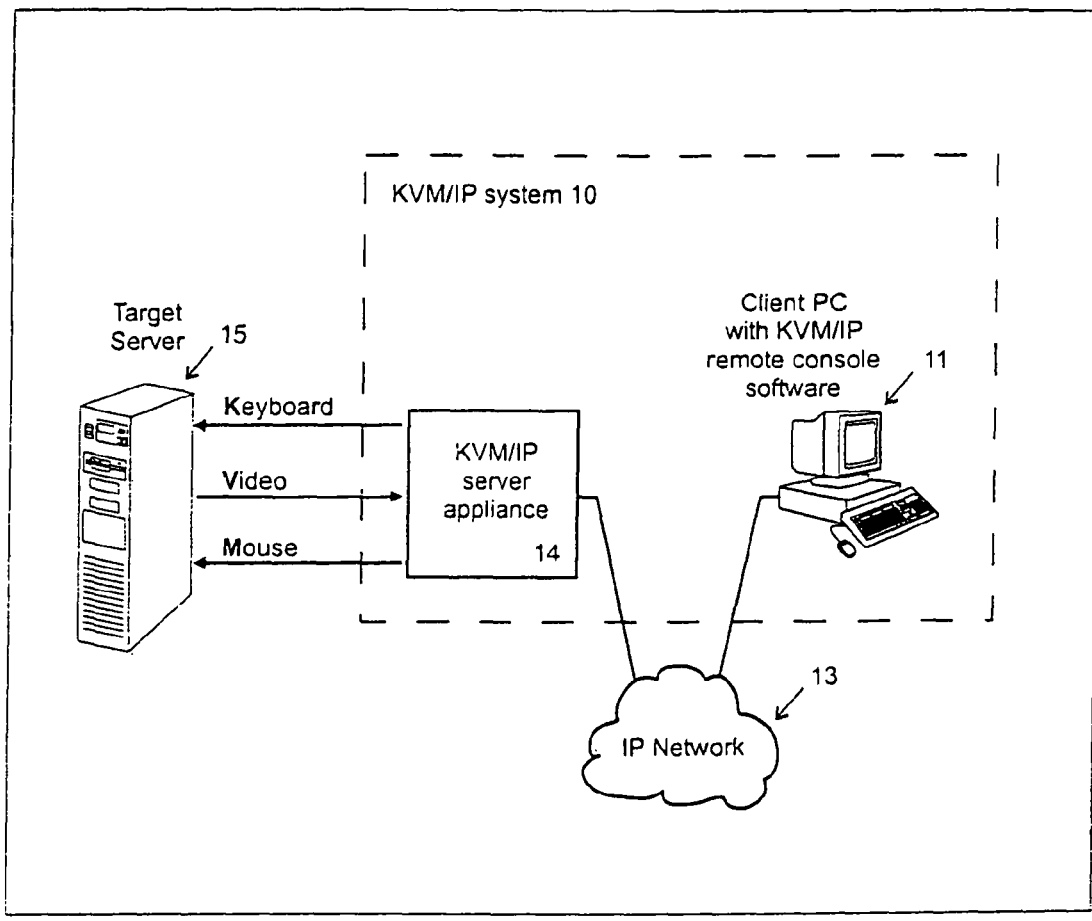
FIG. 1 is a schematic representation of an example embodiment of the present invention in a KVM/IP system with the client implemented with PC software.

The present invention can be implemented with any hardware or software that aims to send computer video over a communication channel, including over an intervening network. One such example embodiment is shown in FIG. 1, which is described by way of example rather than limitation. Indeed other embodiments will be understood once the artisan reviews the invention, as embodied in the appended Figures and described herein.

In FIG. 1, the KVM/IP system 10 includes a remote console client 11 and a server appliance 14. In the embodiment shown, the remote console 11 is implemented with PC software in a network-ready PC (which includes a keyboard, video display and mouse). The client 11 communicates via an Internet Protocol network 13, to a target server 15 via the KVM/IP appliance 14. The appliance 14 and the client 11 include standard network I/O hardware and software to permit them to communicate via any form of Internet protocol connectivity, such as a dial-in, DSL, WAN, LAN, T1, wireless, etc.

In FIG. 1, the appliance acts as an intermediary between the target server 15 and the client 11, permitting the client 11 to couple its keyboard, video display and mouse to the server 15 just as though the client 11 was directed connected to it. In that regard, the manner and operation of the system 10 combined with the addressing and switching capability of the IP network is typical of KVM switches such as those sold by the present assignee, and by Cybex Computer Products of Huntsville, Ala., and by Apex, Inc. of Redmond, Wash.

The client 11 includes software that facilitates the identification of the target server 15 (via the appliance 14) such as by a standard TCP/IP address. Once communication is established between the client 11 and the appliance 14, the client 11 employs software to send keyboard and mouse data, entered at the client, to appliance 14 via the IP network 13. The appliance 14 receives the data switched or routed to it, and applies it to the keyboard and mouse ports of the server 15 just as if the keyboard and mouse were directly attached to the server 15. In response, the server 15 acts on the keyboard and mouse data (via whatever application is running on the server 15) to produce new video data, which is output to the appliance 14 via the video output of the server 15.

Once the appliance 14 receives the video from the server 15, it compresses it by one of the inventive algorithms described below and transmits the resulting video compression commands to the client 11 via IP network 13. Compression can be done with an FPGA, ASIC, or any other hardware or software in the appliance 14. Alternatively, appliance 14 can be "embedded" into the server 15, or it can be eliminated if server 15 includes software to perform the compression and send the resulting commands directly to the IP network 13. Upon receipt, the client 11 decodes the commands with PC software and reproduces the target server's video on the client PC's screen for viewing by the user. Alternatively, the command decoding could be done with hardware in the client 11.

In the embodiment of FIG. 1, the user should perceive the client PC's keyboard, video display and mouse as being directly connected to the server 15, even though the client 11 and the server 15 may be physically located as far away as opposite ends of the globe. Imposing too much delay in getting the keyboard and mouse data to the server 15 via the appliance 14, and in getting the video back can impede that objective. The keyboard and mouse require a relatively small amount of data traffic, which can be transported quickly and relatively efficiently, but the high volume of video data presents a more difficult problem. To be effective, the video must be compressed by the appliance 14, transmitted via the IP network 13, decompressed by the client 11, and presented on the user's screen as quickly as possible. Excessive delay is most evident in mouse-cursor response. Even slight lags between mouse movements and the cursor response presented on the screen are annoying to the user.

Figure 2:
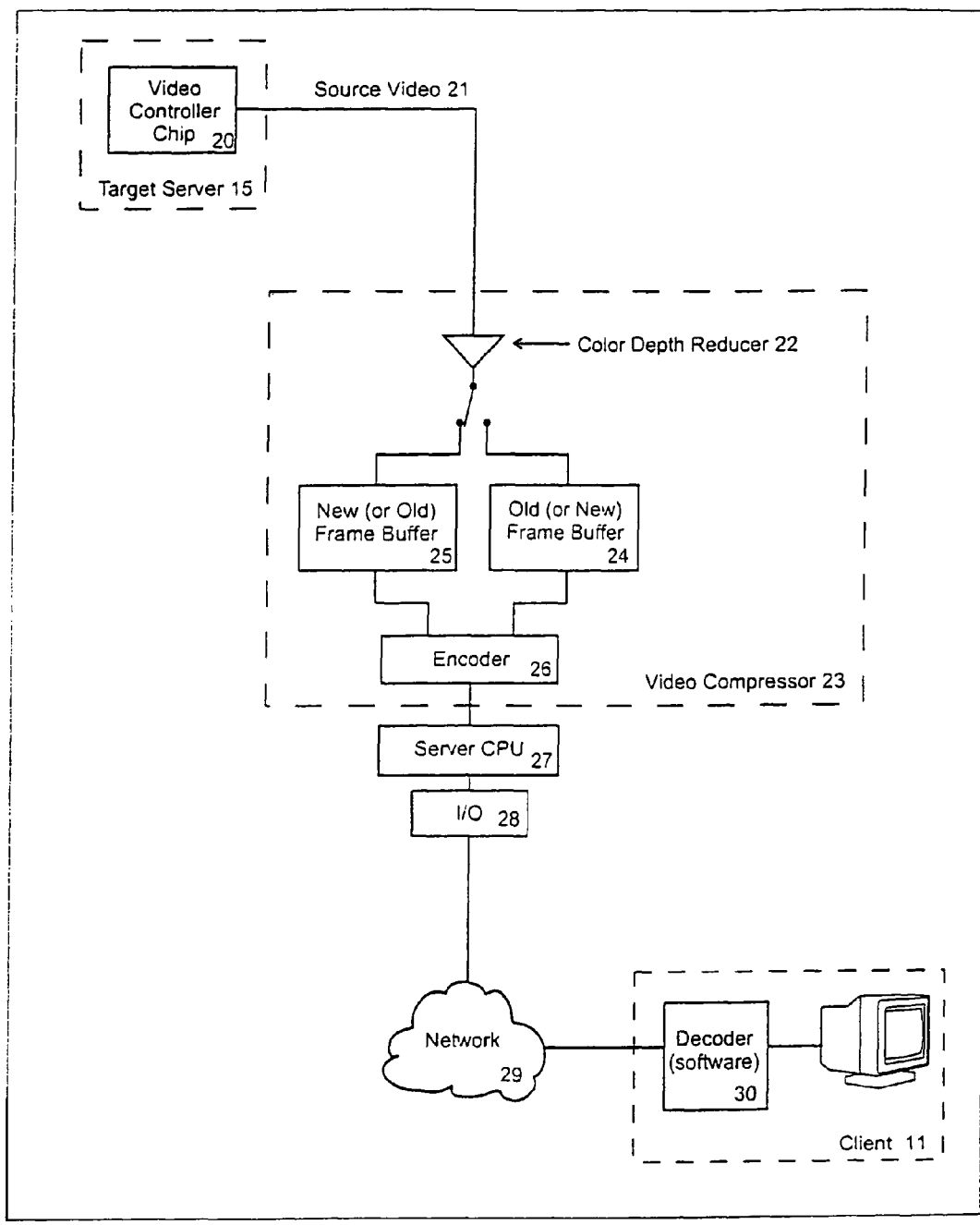
FIG. 2 is a schematic representation of an example embodiment of the present invention showing the internal operation of a hardware video compressor.

FIG. 2 illustrates an example embodiment of the present invention. There are many different hardware and software implementations that the present invention can be envisioned within and the embodiment of FIG. 2 is not the only such way. After reviewing the present teaching, the artisan will recognize other ways consistent with the breadth of the present invention in which to implement the invention.

At the top of FIG. 2, the source video 21 can be in any form, analog or digital. Most current video controller chips have their video output available digitally for use with flat panel displays, such as used in laptop computers. The video compressor 23 could connect directly to the output pins of the video controller chip 20 or it could connect to an external connector on the target server 15. One type of external connector is DVI (digital video interface), which is a standard for connecting digital video to external digital display devices. Any other type of source video will suffice as well—the invention is not limited as such.

Optionally, a color depth reducer 22 can be included in the video compressor 23 to reduce the number of bits defining the color of each pixel. It does this by categorizing pixels' colors into zones. When the source video 21 is digital video, the simplest means of color depth reduction is to ignore the least significant bits. For example, 24-bit color could be converted into 15-bit color by ignoring the least significant 3 bits of each of the 8-bit red, green and blue signals. Ignoring the least significant 4 bits of each 8-bit color signal would result in 12-bit color. More complex color reduction methods referred to as the 7-bit gray-favored color mode and the 5-bit gray-favored color modes are described further below and illustrated in FIGS. 11 and 18.

If the source video 21 is an analog video signal, the color depth reducer 22 needs to include an A-to-D (analog to digital) converter. With analog video, each pixel is defined by three analog signals (red, green and blue). The A-to-D converter digitizes the intensity of each pixel's three signals by detecting what "zone" they are in (very similar to what the digital color depth reducer described above does). A major difference with analog video is noise. When an analog signal is on the edge of a zone, a small amount of analog noise can make the digitizer bounce back and forth from one zone to another in subsequent frames. In such a case, it will appear that the source video 21 is changing even if it is not. Consequently with an analog input, some method of noise suppression needs to be used to reduce this "zone bouncing." Any noise suppression techniques can be used, but in one example, when the input signal is within a zone, it must get out of that zone by at least a threshold amount before it is considered to be in another zone. This comparison of what zone each pixel's signals were in during the previous frame is done for every pixel in the video frame.

Although the several embodiments mentioned for the source video are contemplated within the present invention, the particular example embodiment in FIG. 2 presumes digital video received from a video controller in the target server 15 will be the source video. The output of the video chip 20 is the source video 21, which is a continuing stream of video data. The video controller chip 20 need not be controlled by any aspect of the present inventions (though the inventions can certainly be employed in conjunction with some video chip control), that is, the video chip 20 will output video in a continuing stream in accordance with its own internal timing.

The source video 21 is the input to the video compressor 23. Of course, other processing devices, such as general or special purpose processors can be substituted for the hardware video compressor 23. The video compressor 23 includes at least two frame buffers 24 and 25, and may include many additional frame buffers or frame buffer types for additional operational complexities and efficiencies. Prior to the client 11 establishing a connection over the network 29, the source video 21 is continuously captured (and continuously overwritten) in one of the frame buffers 24 or 25 (at the instant shown in FIG. 2, frame buffer 25 is active, meaning it is capturing the video).

When a client initially connects over the network 29, the video capturing stops and the encoder 26 begins reading and compressing the captured video data in buffer 25. It starts at the beginning of the frame buffer (which is the upper left pixel on the screen) and progresses pixel-by-pixel to the end of the frame buffer (which is the lower right pixel on the screen), looking ahead and building the most efficient sequence of commands. As the encoder 26 builds this series of commands (in accordance with the algorithm embodiments described below), the server CPU 27 is sending them to the client 11 via the I/O 28 and the network 29. After the encoder 26 is finished with the last pixel in the buffer 25, the frame buffers switch and source video begins to be captured in the other frame buffer (buffer 24 in this case). This switch occurs even if the CPU 26 has not finished sending the commands to the network 29. After the switch, the frame in buffer 25 becomes the "old" frame and represents the frame displayed (or soon to be displayed) on the client's screen.

Since the source video was continuing to run while it was not being captured, it might be half way down the screen or anywhere else in the screen when the capturing begins. Regardless of where the new capture into buffer 24 starts, it continues for one full lap until it gets back to the screen position from which it began capturing. The result is one full "new" frame of video captured from the source video 21. If the CPU 27 has not been able to send all the commands from the first compressed frame over the network (possibly due to network congestion or a slow network) after the new frame of video is captured, then the capturing process will continue overwriting the captured video in buffer 24. When the network is ready for more commands (and at least one frame of video has been captured), the capturing will stop and the same process that occurred for the first frame will continue. However, since the client 11 now has its first frame, the encoder 26 will now be able to compare each pixel in the new frame with each pixel in the old frame and if pixels didn't change, the compression will be much better. The same process now continues after at least one frame of new video has been captured and the network is ready for more commands. This process of continuing to capture while waiting for the network to be ready lowers the effective frame rate to the client depending on network conditions and displaying the "newest" video takes precedence to displaying "all" of the video. In effect, captured video becomes an expiring commodity. The remote console users accept frame rate loss much more than the video delay they would have to tolerate if "all" the video motion was queued and sent later.

Thus, in the present example, the new frame buffer (formerly the old frame buffer) captures the most recent frame of source video. Then, the old frame (in the old frame buffer) and the new frame (in the new frame buffer) are read by the encoder 26 for the purpose of comparing and compressing the video. There are alternative methods of capturing and comparing video frames for compression and all such methods will not be described here.

In the narrower of the embodiments of the present inventions, all aspects of the video encoding described herein with respect to FIG. 3 are employed. The detailed description of all of those aspects described herein with respect to "the invention" or "the inventions" should not be construed to mean that the invention requires every aspect of the example algorithms described. The examples are provided for purposes of describing one example way in which the efficiencies of the inventions can be realized. Other, broader and narrower, aspects of the invention may be realized from the descriptions that follow. Thus, in FIG. 3, five video compression commands are presented for compressing the video read from frame buffers 24 and 25. They are, in hierarchical order, (1) copy old pixels from an earlier frame, (2) copy the pixel from the left, (3) copy the pixels from above, (4) make a series of pixels using a 2-color set, and (5) make one pixel using a specified color. The inventor has discovered that this combination of hierarchical commands provides compelling video compression for computer displays. The first three of these commands provide 3 dimensional copying (horizontal, vertical and time) and the fourth command provides unique efficiencies for screen segments that are comprised of only two colors (such as text).

In the embodiment illustrated in FIG. 3, there are five different video compression commands. All of the commands are made from either single packets or multiple packets, where each packet consists of one 8-bit byte. The first one to three bits of the first packet of each command is the operation code (or "opcode") and they determine the command's basic function. The "E" bit is the "extension" bit and the rest of the bits (R, C and P) are the "payload" bits. The general formats of the five commands are shown in FIG. 3, and the more detailed formats of them are shown in FIGS. 4-10. For embodiments with different packet lengths, the number of payload bits would be different. For example, 16-bit packets would have 8 additional payload bits.

The lowest hierarchical command, the MP (make pixel) command has a one in the first bit location (bit position seven) followed by payload bits ("P" bits) that define a color (none of the other commands begin with a one). If the number of color bits used is seven, the MP command is one byte long (as shown in FIG. 3). If the number of color bits used is fifteen, the MP command will be two bytes long, with the first bit of the first byte being a one (as shown in FIG. 4). Likewise, if the number of color bits (P bits) is 23, the MP command will be three bytes long (as shown in FIG. 5), and so on. The MP command is the simplest command to understand, and also provides the least compression. It says, essentially "make one pixel this color" with the payload identifying the color. A popular setting for computer consoles is 15-bit color (5 bits for red, 5 for green and 5 for blue). 15-bit color would be supported by two-byte MP commands. Since single-byte MP commands have seven payload bits, they can present $2^7$ (or 128) different colors. The 7-bit gray-favored color mode described further below describes how the source video can be "reduced" to the nearest of 128 colors widely used on computer consoles. The following discussion of the present invention's operation describes the operation with one-byte MP commands but the invention is not limited to a specific number of color bits (P bits).

In terms of compressibility, a frame where every pixel is a random color would be non-compressible without resolution loss (other compression systems, such as JPEG, fractal analysis, etc. could provide compression with varying degrees of resolution loss). With the embodiment of FIG. 3, every single pixel in this random frame would be encoded with an MP command and if this frame had one million pixels, it would take one million MP commands to encode it. If the encoder cannot use any other command to encode a pixel, it uses an MP command. Every pixel will always qualify to be encoded with an MP command. The MP command thus takes its place in the lowest hierarchical position in FIG. 3. Being a listing of priority, FIG. 3 indicates that the encoder 26 tries to make the top command, then the second, then the third, then the fourth, and then it gets to the MP command as a last resort.

Looking now at the opcodes in FIG. 3, a "one" in bit-position seven uniquely identifies a make-pixel command. If a "zero" is in bit-position seven, that command is one of the other four commands shown in FIG. 3, with the next two bits (bit positions five and six) identifying which of the other four commands applies. Thus, a 00 in bit locations five and six indicates a CO (copy old or no change) command, a 01 indicates a CL (copy left) command, a 10 indicates a CA (copy above) command, and a 11 indicates a MS (make-series) command. Thereafter, each of these four command types has payload bits that follow the opcode. The payload bits are the R, C and P bits. The E bits will be discussed below under the MS command.

The payload bits (R bits) in the CO, CL and CA commands indicate the number of times the command operation is repeated. The CO command instructs the client that pixels have not changed from pixels currently displayed. Thus, the encoder 26 compares the old and new frame buffers and evokes CO commands when it determines that current pixels in the "new" frame are no different from pixels at the same locations in the "old" frame. Thus, CO commands are sent for portions of the screen that are not changing in the source video.

The next two commands compare pixels in terms of locations within a common "new" frame, rather than as between the old and new frame. The CL command instructs the client to copy the color from the pixel in the position immediately to the left in the current frame. If the current pixel is the first pixel on a video line, the pixel immediately to the left is the last pixel on the previous line. The CA command instructs the client to copy the color from the pixel immediately above in the current frame. The CL, CA and CO commands are referred to below as "copy" commands. Other commands may be substituted that provide copying of pixels with relations within a common frame or as between old and new frames. The presently described commands have particular advantage in computer video because of the proliferation of horizontal and vertical rectangles and lines that exist in computer video. With horizontal lines, for example, CL commands have particular utility and with vertical lines, CA commands have particular utility.

The final command is the MS or make-series command and is itself unique in the present types of video encoding. The MS command takes advantage of a particular aspect of computer video, namely that large portions of typical computer screens are composed of only two colors. The classic example of that in computer video is text information in which large portions of the screen are made from with a text foreground color on a solid background color. In such cases, the MS command permits the encoder 26 to create a substantial amount of the video without loss of sharpness in the text, and with very substantial amounts of compression.

Each of the commands will now be discussed in the context of their payload structures and in the context of real applications. As previously described, the CO command (FIGS. 3, 6 and 7) essentially identifies that a present pixel has not changed from the pixel located in the same location of the previous frame. To further the compression, the payload also identifies not only that a present pixel has not changed, but also that some number of consecutive pixels didn't change. What that number will be is described below. As shown in FIG. 3 for the CO command, after the three-bit opcode, there are five bits (RRRRR) that indicate the repeat count of that CO command. These five bits can be set to any binary value between 0 and 31.

Since a repeat count of zero doesn't make sense, one would initially assume that these five bits count define up to 32 consecutive pixels in a row that did not change from the previous frame. However, if one-byte MP commands are only being used (instead of two or more byte long MP commands) a repeat count of one also does not make sense, since a one-byte make pixel (MP) command has the same compression value as an CO command with a repeat count of one. In that case the repeat count payload could start with a count of two, such that a payload of 00000 means a repeat count of two and a payload of 11111 means a repeat count of thirty-three. With that, a small additional efficiency is provided, namely that an CO command with a five-bit payload identifies the fact that somewhere between two and thirty-three pixels have not changed from the frame displayed already.

The preferred embodiment adds still further efficiency. Suppose that more than thirty-three pixels have not changed. As shown in FIG. 6, a second immediately consecutive byte with a 000 opcode can follow a first byte with 000 opcode, providing a second five bits to represent from two to thirty three pixels again. But, instead, the decoder 30 will detect two consecutive packets with CO opcodes, and interpret both the five bit payloads as a single CO command with a ten-bit payload. With a ten-bit payload, the number of consecutive CO pixels extends from 34 to 1025. In other words, with just two eight-bit bytes, a frame of over one thousand pixels can be sent to the client. The CO command is escalating in its efficiency. One can note that there is no other reason to make two consecutive packets with CO opcodes other than the fact that a repeat count over 33 is required. The encoder 26 will not make two consecutive packets with CO opcodes if a repeat count over 33 is not required.

A two-byte CO command gets inefficient briefly if the encoder 26 requires a repeat count of 35 or 36, requiring a second byte. But, once the repeat count gets up to a thousand pixels (such as a full line on a 1024×768 resolution screen), just two bytes can compress the whole line. Further, if a third CO command follows the second (as shown in FIG. 7), the decoder 30 detects a fifteen-bit payload. If there's a fourth CO command, it detects a twenty-bit payload. A four-byte CO command can identify that over one million pixels have not changed, which is more than is needed for a complete frame with 1024×768 resolution. The present invention is not limited to any particular number of consecutive CO commands or any video screen resolution, but for present purposes, a five-byte command (that supports up to 33 million pixels) provides a repeat count large enough for a full frame at the highest video screen resolutions currently envisioned.

The CL and CA commands operate the same as the CO command described above. They duplicate different pixels (pixels to the left, or pixels above) but they have the same structure, a three-bit opcode followed by a 5-bit RRRRR payload identifying a repeat count. Again, each of the CL and CA commands can be sequenced, as shown in FIG. 8 for the CL command, to form 10 bit, 15 bit, 20 bit, or longer payloads.

The hierarchical priorities between the CO, CL and CA commands only apply if two or more of those commands simultaneously qualify on the current pixel. If the encoder 26 determines that the CO command qualifies on the current pixel and no other copy command qualifies, the encoder temporarily ignores the other copy commands and continues to compare pixels from the old and new frames, to determine how many pixels in a row the CO command qualifies for. The encoder 26 would do the same thing if it discovered that the CA or CL commands alone qualified on a current pixel. At the first instance that the identified (CO, CA or CL) condition is no longer true, the encoder 26 sends one or more consecutive commands of FIG. 3 and then evaluates the next pixel for encoding. In other words, once the encoder 26 determines that one repeat count condition is true for a given pixel, and only one repeat count condition is true for a given pixel, it ignores all other command evaluations until the current repeat count condition is no longer valid. When that occurs, it creates the command (opcode and repeat count) and sends it to the client.

As long as one copy command (CO, CL, or CA) qualifies, the encoder continues with it until it no longer qualifies. Then the encoder ends that analysis and creates the appropriate bytes. If, however, multiple repeat count conditions (CO, CA or CL) initially qualify on the same pixel, the encoder just starts counting consecutive pixels for which those conditions apply. As long as one of these commands qualifies, the counter continues to run. Eventually, the encoder will choose only one command that applied for the full repeat count so it only counts one counter. It does not need to run three different counters, one for each copy command. Then, as the encoder continues to count, it will discover that some commands no longer qualify. When that occurs enough times so that no command type is "left standing," the encoder 26 creates the opcode for the last surviving command, together with the repeat count identifying the number of pixels that qualified before the last surviving command failed to qualify.

As an example, suppose for a current pixel, CL, CA and CO commands all qualify. The encoder records that and begins counting. In the next pixel, the encoder determines that all still apply, and so increments the counter to two. The process continues identically until, in the seventh pixel, the CL condition no longer applies. The encoder 26 drops CL out of the running and continues incrementing the counter. Continuing, suppose in the $14^{th}$ pixel, the CA condition becomes false. The CO command is the last survivor, but the encoder still does not stop counting. It continues incrementing until, suppose in the $51^{st}$ pixel, the CO condition becomes false. At that point, the encoder 26 sends two consecutive bytes to the client 11: 00000001 and 00010000. The first byte indicates a CO condition (opcode=000) for what first appears to be a repeat count of three (recalling that a "zero" specifies a repeat count of two). But, when the decoder 30 looks ahead to the next byte, it sees that the consecutive CO commands are to be read together to form a ten-bit word. (Note that the decoder 30 will also look to the next byte beyond the 00010000 byte before decoding the word, to be sure that a third CO byte does not follow the second one). The ten-bit word: 0000110000 equates to a repeat count of 50. This series of two CO commands instructs the decoder to not change the next 50 pixels from the colors they were in the previously sent frame.

Once a copy command becomes the last one standing, the opcode for the next command is determined. When this last standing command no longer qualifies, the repeat count for that command is determined. At that point, the encoder also determines how many bytes are necessary to identify the repeat count. If the count can be provided in five bits, the encoder generates a one-byte command. If ten bits are required, the encoder generates a two-byte command, and so forth. This aspect of the preferred embodiment is advantageous because it capitalizes optimally on the identification of the longest possible repeat counts. In fact, one can envision other copy commands, other than CA, CL and CO, which identify pixels based on other relational aspects.

The hierarchical priorities between the CO, CL and CA commands apply if two or more of those commands are equally last standing. In that case, the encoder resorts first to the copy old command. The copy old command presents the least burden on the client because the result is only skipping over pixels. On the other hand, the client has to work to copy from above or to copy from the left. As between these two copy commands, the copy left is higher priority than copy from above, again because it presents less of a burden to the client. With a copy left, the client only needs to read the immediately preceding pixel once and write it a number of pixels. To copy from above, however, relies on reading a number of pixels from the video line above and writing to a number of pixels.

On the other hand, if the client were implemented with hardware rather than software, the copy command priority may not matter because the hardware may be dedicated to processing commands. The preferred embodiment minimizes the load on a software client by prioritizing the copy commands.

The fourth command type (and the highest priority of non-copy commands) is the MS (make-series) command shown in FIGS. 3, 9 and 10. Based on analysis of the compression of typical computer screens, the make-series command ends up contributing a great deal to the efficiency of the compression. The theory on the MS command is that text, no matter what color it is in, is almost always in a two-color mode. Indeed, the inventor examined typical computer screens and determined that large portions of text and other areas of the screen can be defined with long MS commands. The MS command provides great efficiency in compressing the text portions of icons, of documents, of labels, and of tool bars. Other compression schemes either do not provide the requisite compression efficiency or do not provide the sharpness demanded by users who have to read text material on the screen.

Take, for example, the instance where a user is scrolling through text such that from one frame to the next, the text is just shifting up a little bit. From the compressor's point of view, each frame is a new group of pixels that need to be encoded. The compressor may get some repeat count efficiency by writing CO commands for areas around the text window, but when it hits the adjusted text, repeat count compression becomes inefficient because long repeat counts don't occur. The inventor has added efficiency for those text-type areas where copy commands don't work well. Exactly how those MS commands add compression efficiency will now be described.

First, like before, the three-bit opcode identifies the MS command. The first opcode bit (0) indicates that the command is not a make-pixel command. The next two bits (11) identify the command as a make-series command. Opportunities to evoke the MS command are identified by the encoder looking ahead four pixels. The artisan should note that the copy commands require no look-ahead operation (though look-ahead operations can be added for the sake of providing additional features). With the MS command, alternatively, more or less pixels can be used for this look-ahead operation. As will be seen the number of pixels in the look ahead should be chosen strategically to be (1) large enough to ensure that repeat count coding won't be more efficient, (2) short enough to make the MS command appropriately applicable, and (3) valued as an integer that accommodates the word length being used. Solely for purposes of example herein, four pixels will be described. MS commands are invoked when the encoder determines that, within the next four pixels, two conditions occur: (1) that a CO, CL or CA command is not going to qualify, and (2) all the pixels in those next four pixels are limited to two different colors. The "extended" MS command, shown by example in FIGS. 9 and 10, extends the MS operation, but only the first byte includes the opcode in bits 5, 6, and 7. The extended MS command is described further below.

As previously described, the MS command is used for a series of pixels that are a combination of two different colors. The two colors that are included in the set of available colors are the color from the immediately preceding pixel (color 0) and the most recent different color pixel before that (color 1). Of course, other methods of identifying the two pixel colors for the MS command can be employed from a variety of options, including strict identification of the colors, identification from selected positions in the present frame, or the previous frame, identification from a lookup table of two-color sets, etc. In the preferred embodiment, the two colors are derived from the immediately preceding two different color pixels, which may have been encoded using make-pixel, copy-above, copy-left, or copy old commands. The MS command does not care how these two pixels got there, just that they will become the two colors for the upcoming MS command's series of pixels.

The MS command with the two-color set described above is advantageous because it does not require bytes with any color identification bits. That is, the MS commands do not include bits that identify which colors are being used, only which of the two previously identified colors are being used in the series. So, for example, when the encoder reaches the beginning of some text, such as the top left corner of a black letter "H" on a white background, the first pixel on the top left corner of the "H" may be defined with a black MP (make-pixel) command followed by a CL (copy-left) command for a few pixels. As the top center and top right of the H are found by the encoder's look ahead, the encoder will create a make-series command because it is detecting only two colors (text and background) in the coming pixels.

As shown in FIG. 9, the first MS command byte has a three-bit opcode followed by an "extension" bit (in bit position 4) that indicates that this command is extended to the next byte. If the extension bit is zero, the MS command is not extended, and it ends after the first byte. In such a case, the four "C" bits in that byte provide the two-color pattern for four pixels and then the present series ends. If, however, the extension bit is on, then another whole byte of MS data will follow the present one. Thus, in FIG. 9, the second byte is an "extended command" byte. Because the extension bit is present in the preceding byte, the next byte need not include the three-bit opcode. The identity of the extended command thus comes not from an opcode in the present byte, but from the extension bit in the preceding byte. The result provides seven bits for make-series data for every byte following the first byte. Each extended command byte includes its own extension bit (in bit position 7) that identifies whether or not a next byte is an extension byte. This extension can go on as long as the E-bits are on. When the E-bit goes off, the present series stops. The series of FIG. 10 indicates an example of a 13 byte long MS command that will define a series of 88 consecutive pixels.

As the decoder receives the make-series bytes, it begins immediately creating pixels for the client screen, as follows. After reading the opcode 011, the decoder realizes that a make-series is beginning. It reads the color of the preceding pixel and defines that color as "color 0". Then it reads the most recent different color pixel before that and defines that color as "color 1".

The decoder then reads the E-bit to determine whether the series is one byte, or more. Finally, the decoder reads bits 0-3, in order, and creates pixels from the two available colors based on the binary status of each pixel. For the first byte, the decoder will create four pixels. For example, if the first MS byte is 01110110 and color 0 is black and color 1 is white, the decoder will create four pixels (0110) of black, white, white, and black. Then, because the E-bit is set to 1, the decoder will look to the next byte to create seven more black and white pixels.

The first byte of an MS command, in the preferred embodiment, creates four pixels (eight bits minus three opcode bits minus one extension bit). If the encoder finds that less than four pixels are present in the series (i.e., more than two colors are present in the next four pixels), then the MS command cannot be used in the preferred embodiment. Further, if a first extension byte (a second cumulative byte) of MS command is to be used, the encoder must look ahead to find that the next seven consecutive pixels qualify for MS status (i.e., all from only two color choices and no copy command applies). Then, as shown in FIG. 9, the four C-bits in the first byte will identify the first four pixels of the eleven-pixel series, and the seven C-bits in the second byte will identify the next seven pixels in the eleven-pixel series. Thereafter, new MS extension bytes are used only when whole multiples of seven pixels can be added to the series. Hence, as previously described, the encoder "looks ahead" before encoding any MS command byte, in order to: (1) determine whether the first four pixels qualify for MS treatment, and (2) determine whether additional bytes of seven pixels will qualify.

As will now be understood, the MS command defines sequential pixels, using sequential bits, such that each bit corresponds to each pixel being either color 0 or color 1. In effect, the C-bits of the MS commands are like a pixel train.

As previously described, the encoder in the MS mode is always looking ahead and won't set the E-bit unless it sees that it will have enough pixels in the coming series of pixels to fill the next seven bits of a next extension command byte. If the encoder looks ahead and encounters a color different from the two-color set, within the next seven pixels, then it ends the make-series command with the current byte (writing a stop bit into the E-bit of the current byte).

In one embodiment, the encoder is doing comparisons for all of the command types for all of the pixels all of the time. In that case, the comparisons are always running in parallel, and are always running for all commands. When one of the command types recognizes its own applicability, the encoder flags it and determines (based on other comparisons and priorities among the commands) which of the command types is the optimum one for the present situation. In the embodiment of FIG. 2; for example, the video compressor 23 is, for every single pixel, looking for the applicability of each of the five command types, and looking ahead in accordance with the MS command requirements.

The embodiments described above do not work well on the first presentation of photographs on a screen, because photographs require a relatively large number of make-pixel MP commands. Until a still photo is sent once, the encoder does not create many copy commands, which create better efficiencies. Of course, after a still photograph is initially sent to the client, the encoder will generate CO commands for those parts of the screen on subsequent frames. The present embodiments, while less applicable to photographic information, provide extraordinary efficiency in the application of computer console screens, where many vertical and horizontal lines frequently qualify for copy commands and screens include a significant amount of text.

Figure 11:
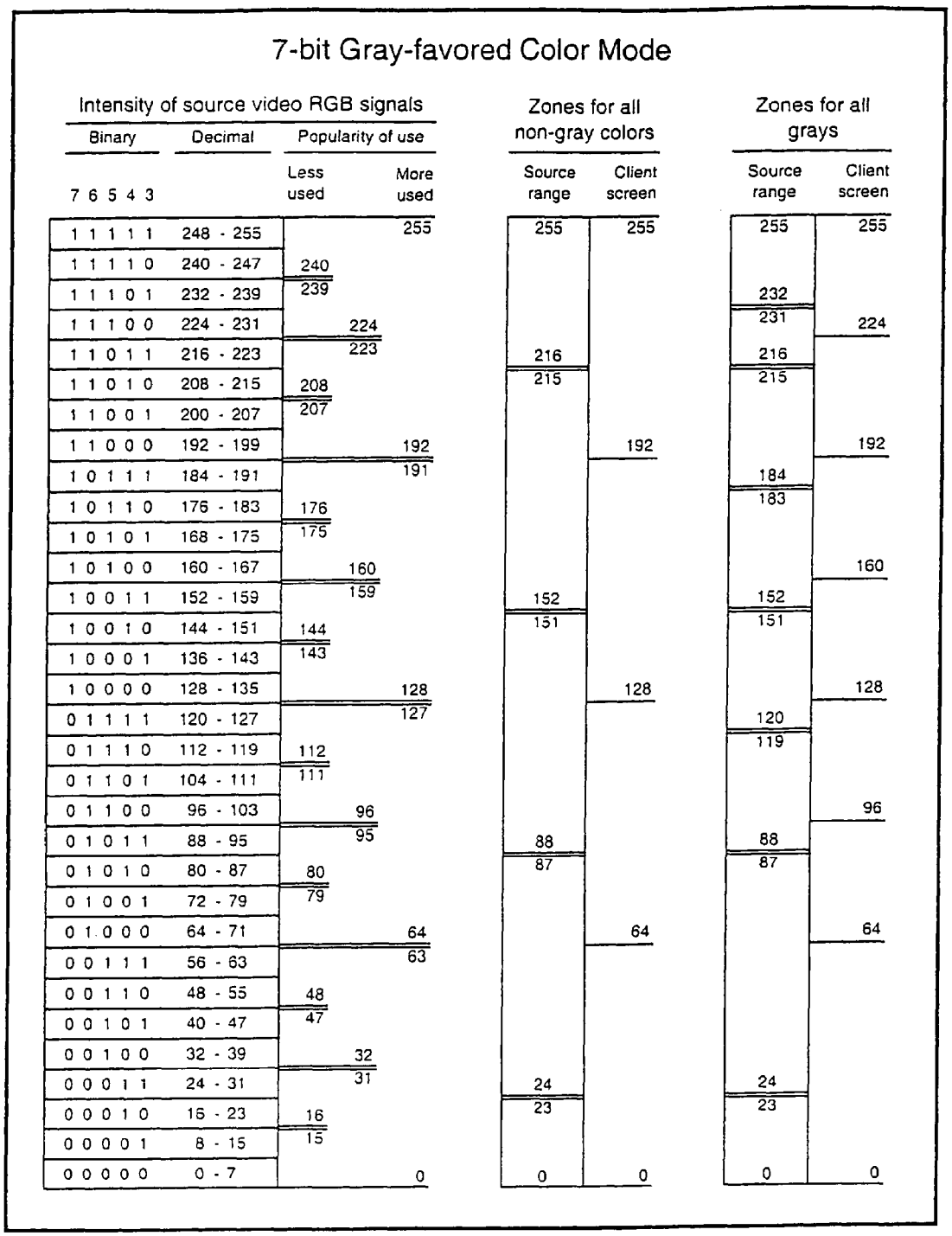
FIG. 11 is a chart describing how color depth is reduced in the "7-bit gray-favored color mode" embodiment of the present invention.

The embodiment of the present inventions referred to as the 7-bit gray-favored color mode provides a novel and creative use of the make-pixel (MP) command vis-a-vis color and gray intensity charts. This mode aims to achieve the maximum performance from the 7-bit payload of a one-byte MP command. As shown in FIG. 11, each of the incoming colors (red, green and blue) ranges in intensity anywhere from 0 (darkest) to 255 (brightest). Some existing computer console color depth reduction schemes use six total bits to define all colors (two bits are provided for red, two for blue and two for green), resulting in four different shades of red, four different shades of blue and four different shades of green. The combination of $4^3$ is 64 possible color combinations.

Grays are also important in computer applications, and consist of each combination in which R, G, and B are present in equal intensity. The six-bit color scheme described above, by default, provides four possible shades of grays. While the four shades of R, G, and B may provide acceptable color depth, the limited numbers of gray shades prove unsatisfactory for gray-scale depth.

In an example embodiment (though not a limiting one), the number of colors can be increased beyond 64 while also increasing the number of gray shades by a greater proportion than the colors were increased. To do so, a "popularity of use" for all colors (including grays) is assigned based on a collection of arbitrary computer console screens, a predetermined color selection, etc. and, from that, a frequency table identifies which colors (and grays) are considered most popular. In FIG. 11, the binary and decimal intensity levels (from 0-255) are shown in the left columns, followed by "popularity of use" ranking. In that column, the longer the line, the more that color was identified in the pool of typical computer screens. As shown, the zero intensity is used often, 63 and 64 are used often, 127 and 128 are used often, 191 and 193 are used often and 255 is used often.

The inventor found that grays were more popular than non-grays on typical computer screens. For example, the scroll bars are gray, the toolbars are gray, and when a "button" is pushed, the edges around buttons are changed to different shades of gray. Black and white are shades of gray and are very frequently used. Computer screens use a lot of different shades of gray, and the shade varieties are important for contrast. As color depth was taken away for video compression purposes, the first place that video quality suffered was on the grays. As it turned out, the actual colors were less critical. For example, it was less important how red a red was or how green a green was. But when depth of grays went away with the color depth reduction scheme, important contrasts like when a "button was pushed" on the screen were lost.

By looking at the popularity of colors, by providing five shades each of R, G, and B, and by finding code locations to add more grays, the present embodiment provides all of the colors needed for good color contrast while adding excellent gray scale contrast. First, a set of popular red, green, and blue intensities was selected. For the example in FIG. 11, each of red, green and blue can occur in one of five of the most popular intensities: 0, 64, 128, 192 and 255. Those become the five different shades provided for each of the colors, namely five shades of red, five shades of green, and five shades of blue. The total number of colors available using those five shades is: $5^3=125$. Within that 125 colors will automatically be five shades of gray, specifically: (1) R, G, and B all equal 0, (2) R, G, and B all equal 64, etc. Five grays is better than four, but it is still not as good as one might desire.

For that reason, additional grays can be coded into a "hidden" area of the pixel encoding. As shown in FIG. 4, the MP command defines the Red, Green and Blue intensities with seven bits. 128 states ($2^7$) can be defined by these 7 bits but, using the five-shade popular color scheme described above, only 125 colors are identified. The present example uses the leftover three states (128 less 125) for three additional gray scales. Now, instead of five shades of gray (RGB=0, 64, 128, 192, and 255), three additional shades of gray (RGB=96, 160 and 224) are included. The eight grays are shown in the far right column of FIG. 11.

Figure 12:
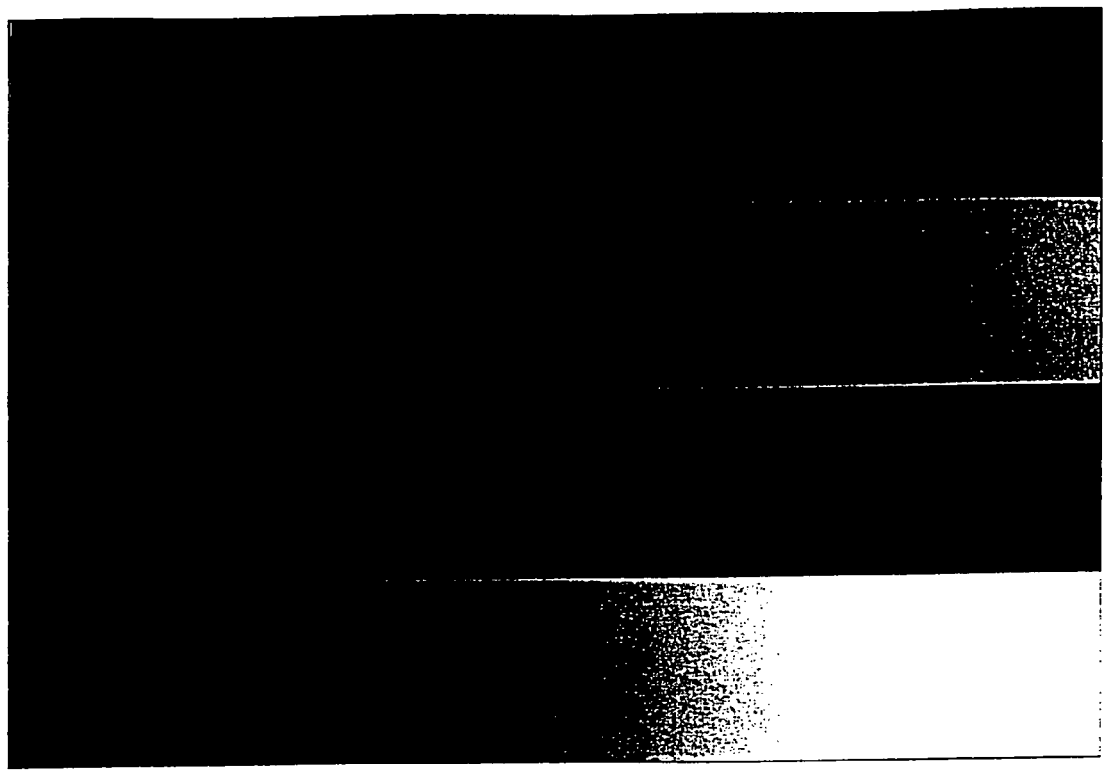
FIG. 12 is a color print of test pattern (referred to as the 0-255 RGB+Gray test pattern) on the video screen of a computer set for 24-bit color.
Figure 13:
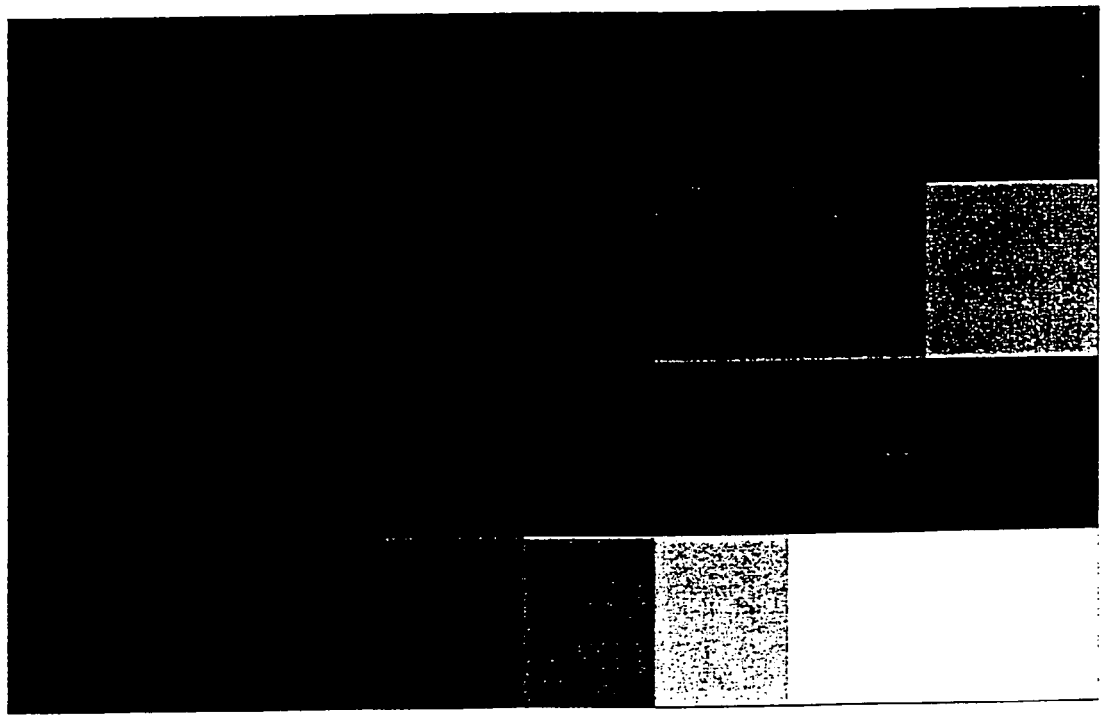
FIG. 13 is a color print of a client computer screen when the "7-bit gray-favored color mode" embodiment of the present invention is employed and the source video is the test pattern shown in FIG. 12.

FIG. 12 is a color print of a test pattern (referred to as the 0-255 RGB+Gray test pattern) on the video screen of a computer set for 24-bit color. The test pattern has horizontal bars of pure red, pure green and pure blue, increasing from zero (darkest) to 255 (brightest). It also has a bar of pure gray (equal amounts of red, green and blue) increasing from zero to 255. FIG. 13 is a color print of a resulting client screen when the "7-bit gray-favored color mode" embodiment of the present invention is employed and the source video is the test pattern shown in FIG. 12. In the end, the 7-bit gray-favored color mode accurately displays the most popular five shades of red, green and blue and provides more levels of grays than the artisan would expect from 7-bits.

Compared to the prior art six-bit color schemes, the 7-bit gray-favored color mode provides better color quality, with twice as many grays (eight versus four). The 7-bit gray-favored color mode has particular application in the computer arts where high color depth is not as critical and has even more particular application in the network administration arts. Network administrators are frequently maintaining servers that are not proximate to the administrator. Still, the administrator needs to access servers and interact with the servers in real time. Getting the video from a server to a network administrator as quickly as possible after keyboard or mouse inputs is important. And prior art video schemes that return video in such poor color or gray quality, or are too slow to keep up with keyboard and mouse inputs are unacceptable. The present compression system with the 7-bit gray-favored color mode provides excellent color quality and exceptional gray scale quality for the network administrator, who needs good video for the functional aspects of a computer interface (buttons, bars, etc.).

In another embodiment of the present invention, the color depth is dynamically increased or decreased as a function of the source video content and/or network bandwidth availability. The video compression encoder would notify the client that the length of the MP commands would be increased or decreased and all other commands would remain the same. Since the MP commands are the lowest priority and are relatively infrequent, the expansion to two or more bytes for each MP command does not dramatically increase the network traffic generated from using most computer screens. Viewing images such as photographs would increase the number of MP commands and increase the difference. Tests have shown that increasing the MP command from one to two bytes only increases traffic on typical computer screens by 30%.

In another embodiment of the present invention, network traffic can be minimized by not sending data if there are no changes to the source video from the previous frame sent. In this embodiment, when the encoder 26 recognizes that no changes have occurred, there is no need to send commands because when client 11 receives no commands, no change is made to the client screen by default. In another alternative embodiment, after some period of time (for example one minute) the server software sends a message to the client to let the client 11 know that the connection is still working and the screen has not changed.

Figure 14:
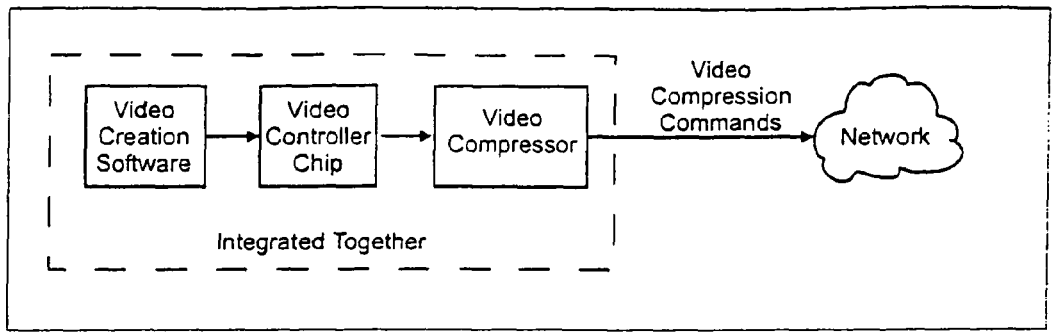
FIG. 14 is a schematic representation of an example embodiment of the present invention with the video creation software and the video controller chip integrated together with the video compressor.

In the embodiment described in FIGS. 1 and 2, the source video comes from video creation software and a video controller chip, both located in the target server 15. Another example embodiment is to have the source video come from video creation software and a video controller chip, both integrated together with the video compressor. An example of such an "embedded" fully integrated system is depicted in FIG. 14.

Figure 15:
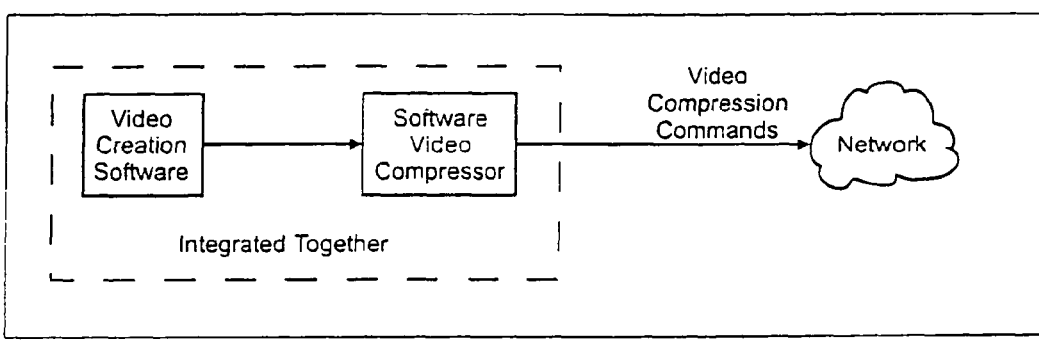
FIG. 15 is a schematic representation of an example embodiment of the present invention without a video controller chip, and with software video compression.

Another alternative embodiment is to compress the video (using the same types of video commands described above) completely with software that interfaces directly with the video creation software, eliminating the need for a video controller chip. An example of such a pure software "controller-less" embodiment is depicted in FIG. 15.

Figure 16:
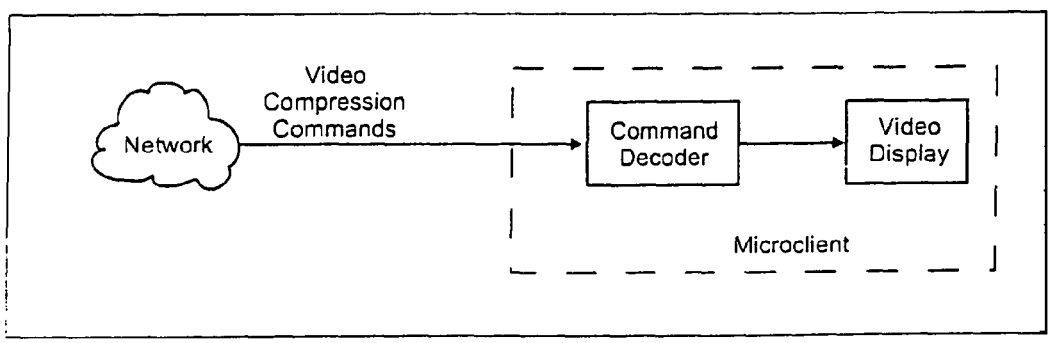
FIG. 16 is a schematic representation of an example embodiment of the present invention referred to as a microclient.

In the earlier example embodiments, the command decoder was implemented with PC software. An alternative embodiment would implement the decoder completely with hardware or with a combination of hardware and a small low-cost low-performance microprocessor. This "embedded" decoder would output its video directly to a video display (without a PC or video controller chip) as shown in FIG. 16. This "microclient" could also contain keyboard and mouse interface circuitry and could also be integrated into the video display. A microclient would be applicable in applications where it is desirable to have all of the workers computers out of the main work area and in a back room. In the work area, only keyboards, monitors and mice would be present on desktops. When a worker moves from one place to another, they could log onto their computer (or any other computer they were permitted to) from any microclient.

Figure 17:
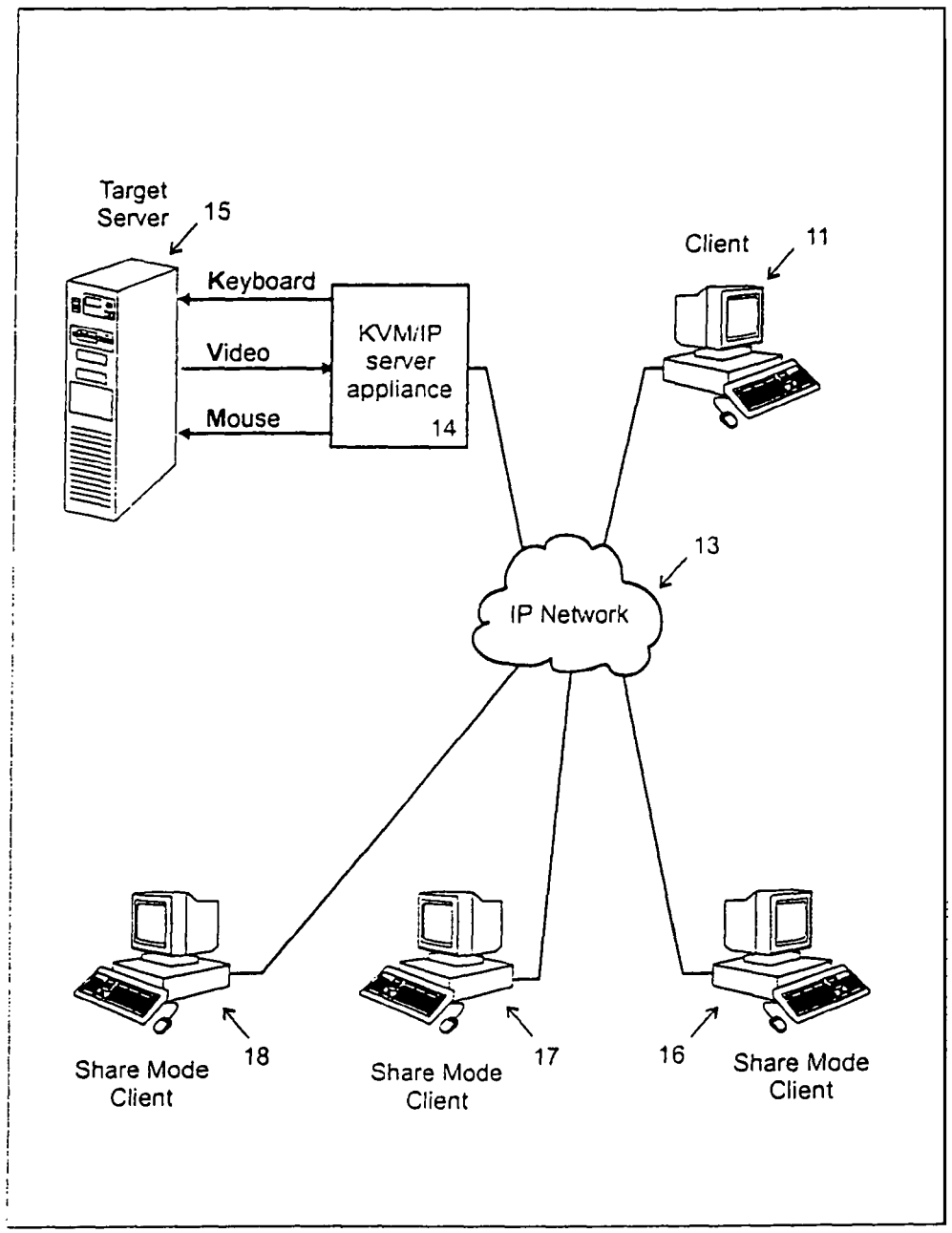
FIG. 17 is a schematic representation of an example embodiment of the present invention describing the concept of "share-mode"

Another example aspect of the present invention will now be described with respect to FIG. 17. If a second client 16 is added (the same as client 11) which also has the same client software and is also connected to the IP network, the server appliance 14 could sent the same video compression commands to both clients, permitting both clients to simultaneously "share" access to target server 15. Usually, in this "share mode," one client is accessing the server 15 and the other client is watching. The example may occur when a client 11 is employing a server and is in some operational error that the client user wishes a network administrator (who is at another location) to see. This is referred to as the "help desk" mode. The share mode is taken to greater extreme in cases where video is multicast, as to a group of trainees sitting at multiple respective client remote consoles 17 and 18.

In share mode over the Internet (especially with a large number of simultaneous users) it is advantageous to employ UDP communication instead of TCP communication. As the artisan will understand, UDP uses unacknowledged datagrams, while TCP's datagrams are acknowledged. The implosion of acknowledgements with a large number of simultaneous share mode users could flood the server appliance. The advantage of TCP is that no data is lost because everything is sent and re-sent until acknowledged. With video, however, the user cares less about what is lost than about continuous video flow. In other words, just because the screen flickered due to a lost frame, does not mean that the user desires that the video return back to the missed frame and start over. The present invention can be employed with TCP, UDP, or any other acknowledged or unacknowledged protocol.

The applicant notes that a disadvantage of UDP protocols is that they can contribute to denial of service attacks that maliciously occur on the Internet. Because UDP is unacknowledged, traffic can flood a server with UDP datagrams. To prevent that, firewalls often block UDP. Using the present invention in the example embodiment employing UDP requires the acceptance of UDP datagrams, however training room environments and other applications for large numbers of share-mode users would typically be inside a facility behind the firewall.

In still another embodiment, data encryption is applied to the video compression commands, such that the compressed computer screens being transmitted are secure from monitoring. Any encryption technology can be employed, but an encryption technology, such as AES encryption, that could be implemented in the same video compressor 23 along with the video compression encoding would be much more desirable from an implementation viewpoint than a separate data encryption device.

The inventor presented the combination of command structures described above combined with the 7-bit gray-favored color scheme as a preferred embodiment because this combination was an optimization of trade-offs that were well suited for computer administrators working in a KVM-style server management environment. Rearranging the command opcodes and changing the color scheme can reduce network bandwidth requirements or increase color depth for other environments.

Figure 18:
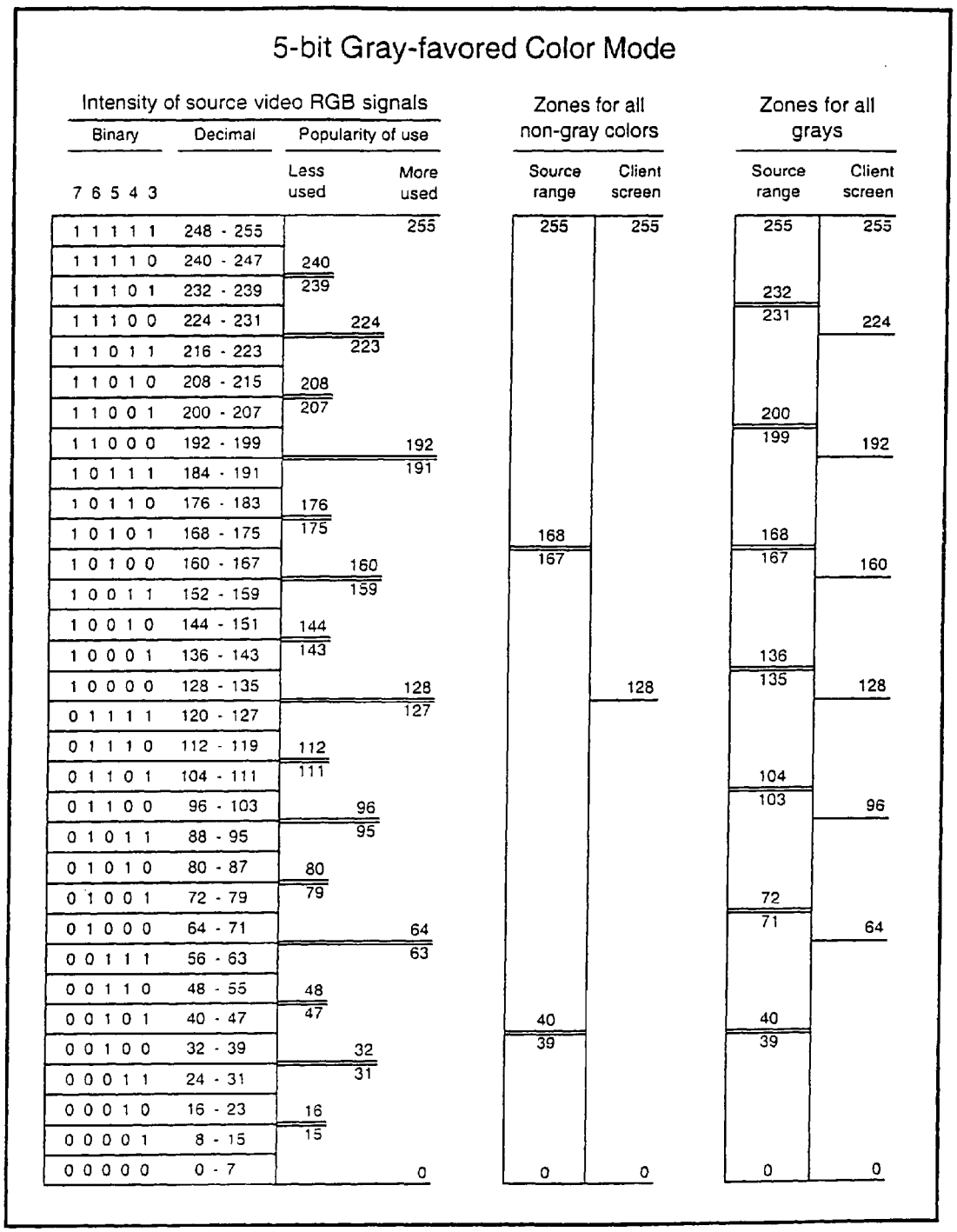
FIG. 18 is a chart describing how color depth is reduced in the "5-bit gray-favored color mode" embodiment of the present invention.

For example, if only five bits of color are used to implement the 5-bit gray-favored color mode shown in FIG. 18, it would be advantageous to exchange the opcodes between the MS command and the MP command, as shown in FIG. 19, because the single bit opcode would be "wasted" on an MP command with only five P bits. In that embodiment, the single bit opcode would be better used to enhance the efficiency of the MS command. It also would eliminate the need for the MS command's extension bit (E bit), since simply sending subsequent MS commands could extend an MS command, as shown in FIGS. 20 and 21. This alternative combination of command structures and 5-bit color offers less color depth but improved performance on screens with a significant amount of text (because of more efficient MS commands), however it offers the same number of grays (8) as the 7-bit color mode described above.

Another embodiment optimized for applications that require more color depth, uses the same alternative arrangement of opcodes shown in FIG. 19, but the MP command is either one or two bytes long as shown in FIGS. 22, 23 and 24. When it is two bytes long it provides 12-bit color (4 red, 4 green and 4 blue) as shown in FIG. 23. When it is one byte long, it provides 4 bits of payload that define 16 shades of gray (red, green and blue all are equal) as shown in FIG. 24. The "A" bit (or "all" bit) in FIG. 22 indicates that all three colors are equal to the value of the "P" bits and the command is limited to one byte. Effectively, the variable length MP command is gray-favored in that less network traffic is generated from one-byte gray commands. In another embodiment, the 4-bit payload of the one-byte MP command represents the 16 most popular colors instead of 16 grays. The 16 most popular colors could be determined by recent usage statistics with MP commands, or by a pre-set list of 16 popular colors. Also, the same advantages of the more efficient MS command in the 5-bit color mode described above are included in this 12-bit color mode. The close similarity of the 5-bit and 12-bit color modes described here would allow an embodiment that dynamically switched between 5-bit and 12-bit color depending on source video content and/or available network bandwidth. Other rearrangements of the commands, similar to those shown to accommodate the 5-bit and 12-bit color modes, could also be advantageous for improved performance in other applications or other environments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method in a data processing system of compressing video having a color depth greater than two colors, comprising:
    comparing some portions of selected video frames having a color depth greater than two colors to other portions of the selected video frames;
    encoding the some portions of the selected video frames based on the some portions' locational relationship within the selected video frames relative to the other portions;
    identifying additional portions of the same selected video frames as pixels comprised only of two colors from a two-color set; and
    encoding the additional portions of the selected video frames as a series of bits having binary states corresponding to the two colors in the two-color set.

2. The method of claim 1, wherein the locational relationship is one from the group consisting of:
    (a) a left location within a common frame;
    (b) an above location within a common frame; and
    (c) a common location within a prior frame.

3. The method of claim 1, wherein the left location within a common frame is a left location one immediate pixel to the left of a current pixel.

4. The method of claim 1, wherein the above location within a common frame is an above location one immediate pixel above a current pixel.

5. The method of claim 1, wherein the video having a color depth greater than two colors is one from the group consisting of:
    (a) 24-bit color;
    (b) 15-bit color;
    (c) 7-bit gray-favored color; and
    (d) 5-bit gray-favored color.

6. The method of claim 1, wherein the locational relationship is one from the group consisting of:
    (a) a left location within a common frame;
    (b) an above location within a common frame; and
    (c) a common location within a prior frame; and
    the video having a color depth greater than two colors is one from the group consisting of:
    (a) 24-bit color;
    (b) 15-bit color;
    (c) 7-bit gray-favored color; and
    (d) 5-bit gray-favored color.

7. The method of claim 1, further including:
    reading a serial string of pixel color data values for the video and recording information corresponding to the pixel color data values for at least one video frame of the video;
    wherein the step of comparing some portions of the selected video frames to other portions of the selected video frames includes comparing current pixel color data values in the serial string of pixel color data values with at least some of the recorded information corresponding to the pixel color data values;
    and wherein the encoding of the some portions of the selected video frames based on the some portions' locational relationship within the selected video frames relative to the other portions includes encoding based on the comparison of current pixel color data values with the recorded information.

8. The method of claim 7, wherein the identification of additional portions of the same selected video frames as pixels comprised only of colors from a two-color set is based on the reading of the serial string of pixel color data values, and the encoding the additional portions as a series of bits having binary states corresponding to the two colors in the two-color set is an encoding based on (1) one binary state corresponding to one pixel color data value read from the serial string and (2) another binary state corresponding to a different pixel color data value read from the serial string.

* * * * *